US008959956B2

(12) United States Patent
Mirth et al.

(10) Patent No.: US 8,959,956 B2
(45) Date of Patent: Feb. 24, 2015

(54) APPARATUS AND METHOD FOR CONTROLLING MOISTURE IN THE MANUFACTURE OF GLASS FIBER INSULATION

(71) Applicant: Owens Corning Intellectual Capital, LLC, Toledo, OH (US)

(72) Inventors: David R. Mirth, Reynoldsburg, OH (US); Steve Geiger, Johnstown, OH (US); Scott Blackwood, Whitesburg, GA (US); Frank Bruce Inglis, Richmond Hill (CA); Terry Burn, Kansas City, MO (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 99 days.

(21) Appl. No.: 13/764,941

(22) Filed: Feb. 12, 2013

(65) Prior Publication Data

US 2013/0152637 A1 Jun. 20, 2013

Related U.S. Application Data

(62) Division of application No. 13/313,094, filed on Dec. 7, 2011.

(60) Provisional application No. 61/421,306, filed on Dec. 9, 2010.

(51) Int. Cl.
*C03B 37/04* (2006.01)
*D04H 1/64* (2012.01)
(Continued)

(52) U.S. Cl.
CPC ............... *D04H 1/642* (2013.01); *C03B 37/10* (2013.01); *C03C 25/26* (2013.01); *D04H 13/008* (2013.01); *D04H 1/4226* (2013.01)

USPC .................. 65/379; 65/455; 65/464; 65/466; 65/467

(58) Field of Classification Search
CPC .... C03B 37/05; C03B 37/048; C03B 37/0206
USPC .......... 65/60.3, 382, 447, 450, 484, 469, 475, 65/485, 514, 529
See application file for complete search history.

(56) References Cited

U.S. PATENT DOCUMENTS 2,647,851 A * 8/1953 Schwartz ..................... 156/62.8
2,707,690 A 5/1955 Pearson
(Continued)

FOREIGN PATENT DOCUMENTS

| WO | 2008/085461 | 7/2008 |
| WO | 2012/078740 | 6/2012 |
| WO | 2012/078743 | 6/2012 |

OTHER PUBLICATIONS

Office action from New Zealand Application No. 612,046 dated Apr. 8, 2014.

(Continued)

*Primary Examiner* — Jodi C Franklin
(74) *Attorney, Agent, or Firm* — Calfee, Halter & Griswold LLP

(57) ABSTRACT

Apparatus, systems and methods for making a fibrous products form molten material into fibers. The fibers are sprayed with a coolant liquid to cool the fibers. A flow rate of the sprayed coolant liquid is controllable. The fibers are also sprayed with a binder dispersion. The fibers are directed toward a conveyor to form an uncured fibrous pack. A thickness of the uncured pack is measured and the flow rate of the sprayed coolant liquid is controlled based on the measured thickness of the uncured pack.

12 Claims, 10 Drawing Sheets

(51) Int. Cl.
  *C03B 37/10* (2006.01)
  *C03C 25/26* (2006.01)
  *D04H 13/00* (2006.01)
  *D04H 1/4226* (2012.01)

(56) References Cited

U.S. PATENT DOCUMENTS

| | | | |
|---|---|---|---|
| 3,020,585 A | | 2/1962 | Piot et al. |
| 3,347,648 A | | 10/1967 | Krakauer et al. |
| 3,355,314 A | | 11/1967 | Gagnon et al. |
| 3,356,565 A | | 12/1967 | Smucker et al. |
| 3,467,739 A | | 9/1969 | Palmer et al. |
| 3,495,808 A | | 2/1970 | Klein et al. |
| 3,539,316 A | * | 11/1970 | Trethewey ............... 65/384 |
| 3,625,667 A | | 12/1971 | Pitt et al. |
| 3,684,467 A | | 8/1972 | Smucker |
| 3,762,896 A | | 10/1973 | Borst |
| 3,791,807 A | | 2/1974 | Etzel et al. |
| 3,824,387 A | | 7/1974 | Garst |
| 3,826,903 A | | 7/1974 | Varrasso |
| 3,877,911 A | * | 4/1975 | Borst ............... 65/451 |
| 3,902,878 A | | 9/1975 | Hoag et al. |
| 3,966,600 A | | 6/1976 | Crowley et al. |
| 4,071,339 A | | 1/1978 | Griffiths |
| 4,141,709 A | | 2/1979 | Reese |
| 4,203,155 A | * | 5/1980 | Garst ............... 700/122 |
| 4,263,033 A | | 4/1981 | Michalek |
| 4,363,968 A | * | 12/1982 | McGowan et al. ........ 250/339.1 |
| 4,451,276 A | | 5/1984 | Barthe et al. |
| 4,517,242 A | | 5/1985 | Sinha et al. |
| 4,582,520 A | * | 4/1986 | Sturm ............... 65/382 |
| 4,592,956 A | | 6/1986 | Gaa et al. |
| 4,728,573 A | | 3/1988 | Temple |
| 4,822,392 A | * | 4/1989 | Fachat et al. ............... 65/525 |
| 4,832,723 A | | 5/1989 | Shsler et al. |
| 5,108,798 A | | 4/1992 | Guerro et al. |
| 5,324,338 A | | 6/1994 | Holmstrom |
| 5,470,658 A | | 11/1995 | Gasca et al. |
| 5,601,629 A | | 2/1997 | Helbing |
| 5,690,715 A | | 11/1997 | Schiwek |
| 6,699,945 B1 | | 3/2004 | Chen et al. |
| 6,884,849 B2 | | 4/2005 | Chen et al. |
| 7,063,983 B2 | | 6/2006 | Chen |
| 7,157,524 B2 | | 1/2007 | Chen et al. |
| 7,185,516 B2 | | 3/2007 | Cline et al. |
| 7,226,522 B2 | | 6/2007 | Perander et al. |
| 7,251,959 B2 | | 8/2007 | Cline et al. |
| 7,326,304 B2 | | 2/2008 | Cline et al. |
| 7,435,444 B2 | | 10/2008 | Freeman et al. |
| 7,718,214 B2 | * | 5/2010 | Charbonneau ............... 427/8 |
| 7,743,629 B2 | | 6/2010 | Miele et al. |
| 7,754,020 B2 | | 7/2010 | Cline et al. |
| 8,091,388 B2 | | 1/2012 | Cooper et al. |
| 2002/0129624 A1 | | 9/2002 | Gao et al. |
| 2003/0041626 A1 | | 3/2003 | Yang et al. |
| 2004/0074262 A1 | | 4/2004 | Miele et al. |
| 2004/0152824 A1 | | 8/2004 | Dobrowolski |
| 2005/0192390 A1 | | 9/2005 | Dobrowolski et al. |
| 2005/0215153 A1 | | 9/2005 | Cossement et al. |
| 2006/0005580 A1 | | 1/2006 | Espiard et al. |
| 2006/0019024 A1 | | 1/2006 | Freeman et al. |
| 2006/0198954 A1 | | 9/2006 | Frechem et al. |
| 2007/0014995 A1 | * | 1/2007 | Chacko et al. ............... 428/430 |
| 2007/0157675 A1 | | 7/2007 | Cline et al. |
| 2007/0287018 A1 | | 12/2007 | Tutin et al. |
| 2008/0156041 A1 | | 7/2008 | Cooper et al. |
| 2009/0004391 A1 | | 1/2009 | Olang et al. |
| 2009/0007644 A1 | | 1/2009 | Freeman et al. |
| 2009/0031759 A1 | | 2/2009 | Evans et al. |
| 2010/0068103 A1 | | 3/2010 | Charbonneau et al. |
| 2010/0147032 A1 | | 6/2010 | Chacko et al. |
| 2010/0151223 A1 | * | 6/2010 | Chacko et al. ............... 428/220 |
| 2011/0086567 A1 | * | 4/2011 | Hawkins et al. ............... 442/327 |
| 2011/0091710 A1 | | 4/2011 | Mirth et al. |
| 2012/0144868 A1 | | 6/2012 | Mirth |
| 2012/0144870 A1 | * | 6/2012 | Johnson et al. ............... 65/442 |
| 2012/0145035 A1 | | 6/2012 | Shallenberger |
| 2013/0152637 A1 | | 6/2013 | Mirth et al. |
| 2013/0152638 A1 | * | 6/2013 | Johnson et al. ............... 65/484 |

OTHER PUBLICATIONS

Office action from New Zealand Application No. 612,057 dated Apr. 8, 2014.
Spraying Systems Co., Section F—Air Atomizing Spray Nozzles, pp. F1-F62, www.spray.com.
Notice of Allowance from U.S. Appl. No. 13/313,086 dated Mar. 21, 2014.
Office action from U.S. Appl. No. 13/763,819 dated Mar. 6, 2014.
Office action from Chinese Application No. 201180059458.9 dated Feb 25, 2014.
Office action from U.S. Appl. No. 13/763,819 dated Aug. 8, 2013.
Office action from U.S. Appl. No. 13/313,086 dated Jul. 17, 2013.
Office action from Chinese Application No. 201180059454.0 dated Feb. 28, 2014.
Office action from New Zealand Application No. 612,064 dated Nov. 26, 2013.
Notice of Allowance from U.S. Appl. No. 13/763,819 dated Oct. 1, 2014.
Office action from U.S. Appl. No. 13/313,094 dated Apr. 3, 2012.
Office action from U.S. Appl. No. 13/313,094 dated Sep. 21, 2012.
Office action from U.S. Appl. No. 13/313,109 dated Oct. 9, 2012.
Office action from U.S. Appl. No. 13/313,109 dated Apr. 4, 2012.
International Search Reprot and Written Opinion from PCT/US11/063715 dated Apr. 3, 2012.
International Search Report and Written Opinion from PCT/US11/063720 dated Apr. 2, 2012.
Office action from Chinese application No. 201180059458.9 dated Nov. 3, 2014.

* cited by examiner

APPARATUS AND METHOD FOR CONTROLLING MOISTURE IN THE MANUFACTURE OF GLASS FIBER INSULATION

CROSS REFERENCE TO RELATED APPLICATIONS

This application is a divisional application of U.S. Ser. No. 13/313,094, filed on Dec. 7, 2011, titled "Apparatus and Method for Controlling Moisture in the Manufacture of Glass Fiber Insulation" and claims priority to U.S. provisional application Ser. No. 61/421,306, filed Dec. 9, 2010, the entire contents of which is incorporated herein by reference. Also incorporated herein in their entireties are U.S. provisional applications bearing Ser. Nos. 61/421,301; 61/421,304 and 61/421,310, all filed on Dec. 9, 2010.

BACKGROUND

This invention relates in general to insulation products made from mineral fibers such as fibrous glass and, in particular, to methods and apparatus for controlling product properties by monitoring and controlling moisture in a forming hood.

Fibrous glass insulation products generally comprise randomly-oriented glass fibers bonded together by a cured thermosetting polymeric material. Molten streams of glass are drawn into fibers of random lengths and blown into a forming chamber or hood where they are randomly deposited as a pack onto a moving conveyor or chain. The fibers, while in transit in the forming chamber and while still hot from the drawing operation, are sprayed with an aqueous dispersion or solution of binder. The residual heat from the glass fibers and from the flow of hot gases during the forming operation are sufficient to vaporize much of the water from the binder, thereby concentrating the binder dispersion and depositing binder on the fibers as a viscous liquid with high solids content. Further water may be removed by drying the binder on the fibers. As the water vaporizes, the energy transfer also cools the glass fibers. The uncured fibrous pack is transferred to a curing oven where heated air, for example, is blown through the pack to cure the binder and rigidly bond the glass fibers together in a generally random, three-dimensional structure known as a "blanket." Sufficient binder is applied and cured so that the fibrous blanket can be compressed for packaging, storage and shipping, yet regains its thickness—a process known as "loft recovery"—when installed.

Vaporization or "flashing" of the binder dispersion in the forming hood is a significant problem for multiple reasons. Environmental concern with binder emissions is a first problem, leading some state and federal regulatory agencies to prohibit the release of binder solids or vaporized gasses into the atmosphere. Secondly, binder can accumulate on the equipment in the forming hood, including the chain, the side hoodwalls and downstream air ventilation equipment, causing higher costs for increased binder usage and for cleaning the binder from the equipment. Finally, physical properties of the insulation pack may be adversely impacted by binder concentration and viscosity. Binder and/or glass fibers that stick to hood walls can dislodge into the pack causing wet spots or splotches of higher density. If the binder is too viscous or tacky, the pack may exhibit signs of non-uniform density (i.e. vertical weight distribution); and may become "boardy" at a bottom layer and/or otherwise exhibit increased density near the bottom. In addition, a product may not achieve a desired thickness prior to curing in the oven, and may not meet intended specifications for R-value.

Some of these problems have been partially addressed in the prior art. Due to the growing pack thickness, binder particulates tend to become entrapped to a greater degree at later fiberizing units than at initial ones. The solids that pass through the pack and into exhaust streams tend to come primarily from the first fiberizing units. As one solution to alleviate this problem, sacrificial cooling water or liquid may be sprayed on the hot fiber veil at these fiberizing units to cool the hot fibers before the application of binder. This tends to minimize vaporization of the binder; however, the addition of coolant water causes other problems such as waste water control and wetter packs that require further energy to cure in the drying oven. Thus, to facilitate emissions and water control, manufacturers tend to use cooling water preferentially at initial fiberizing units where no pack is yet developed, and reduce the water usage at subsequent fiberizing units where the pack is building and can filter particulates from the emissions streams.

U.S. Pat. No. 3,877,911 (1975) to Borst describes a multi-ring manifold disposed about the exit end of pivotable lapper bucket 74. A first ring 106 supplies coolant water and a second ring 108 supplies air pressure for atomization of the water. Borst discloses (col. 6) that with water pressure at 90-120 psi and air pressure at 5-15 psi, little atomization occurs and the streams have sufficient kinetic energy to penetrate the veil and impinge on one another in the interior of the veil (FIG. 4). At the same water pressure but at 16-50 psi air pressure, some atomization occurs but the stream is still able to penetrate and cool the veil (FIG. 5).

US Patent Publication 2008-0156041 and WO 2008/085,461, to Cooper, describe coolant spray rings and binder spray rings having different types of nozzles spaced around the rings. The different nozzles have different spray angle properties and include atomizing caps.

U.S. Pat. No. 7,435,444 to Freeman, et al., discloses a process for using a moisture sensor to measure the moisture level of an uncured pack as it leaves the forming area. If the moisture level is too high compared to a pre-set value, a control unit changes one or more of the process conditions to reduce the residual moisture.

SUMMARY OF THE INVENTION

This invention relates to apparatus, systems and methods for monitoring and controlling the amount of moisture introduced into the forming hood area in the manufacture of mineral fiber insulation products so that the products have improved properties.

In one aspect, the invention relates to a method of making a fibrous product comprising the steps of:

attenuating molten material into fibers at a plurality of fiberizing units associated with a conveyor moving in a machine direction, and directing the fibers toward the conveyor to form a fibrous pack;

spraying the fibers with at least one liquid selected from a coolant liquid, a binder diluent, a dispersion of curable binder and mixtures thereof;

curing the binder in the pack;

measuring at least one pack property before or after curing to obtain a feedback measurement, said pack property selected from (a) the thickness of the uncured pack, (b) uniformity of the uncured pack thickness, (c) the thickness of the cured pack, (d) uniformity of the cured pack thickness, (e) the uniformity of the moisture distribution in the uncured pack, (f) uniformity of vertical pack density in the uncured pack, (g)

uniformity of vertical pack density in the cured pack, and (h) degree of cure in the cured pack; and controlling the flow rate of at least one liquid sprayed at at least one fiberizing unit in response to the feedback measurement.

In certain embodiments of this method, the step of controlling the flow rate of at least one liquid may comprise controlling the flow of coolant liquid and/or controlling the flow of binder diluent, if used. Controlling the flow rate may encompass adjusting the flow to at least one fiberizing unit differently from the flow to at least one other fiberizing unit; an adjustment, if warranted, may be to increase or decrease the flow. A flow that was different may become the same; and a flow that was the same may become different. In some embodiments, the feedback measurement may be compared to a target flow rate to decide if a flow rate should be adjusted upward or downward.

Several feedback measurements are possible. One feedback measurement may be the thickness of the uncured pack. For example, if the thickness feedback measurement is less than a target thickness, the method may entail adjusting the flow of a liquid upward; and the flow may be adjusted downward if a pack thickness feedback measurement is greater than the target. Another feedback measurement is the degree of cure of the cured pack. Undercured areas may be a sign of excessive moisture in the pack. Other feedback measurements may include those selected from: the thickness of the uncured pack; the uniformity of the moisture distribution in the uncured pack; the thickness of the cured pack; and the degree of cure in the cured pack. One or multiple feedback measures may be used Advantageously, the feedback measurement can be provided continuously during a manufacturing run, so the step of controlling the flow rate of at least one liquid can be repeated continuously. Alternatively, feedback measurements may be provided at discrete time increments during a manufacturing run and the step of controlling the flow rate is repeated at each time increment.

In another aspect, the invention relates to manufacturing system for making a fibrous product, said system comprising;

a plurality of fiberizing units associated with a conveyor movable in a machine direction, each fiberizing unit including: (a) a fiberizer adapted to form fibers from a source of molten material; (b) a blower for directing the fibers toward the conveyor to form a fibrous pack; and (c) a liquid dispensing system for spraying the fibers with a liquid selected from a coolant liquid, a binder diluent, a dispersion of curable binder and mixtures thereof;

a sensor for measuring at least one pack property before or after curing to obtain a feedback measurement, said pack property selected from (a) the thickness of the uncured pack, (b) uniformity of the uncured pack thickness, (c) the thickness of the cured pack, (d) uniformity of the cured pack thickness, (e) the uniformity of the moisture distribution in the uncured pack, (f) uniformity of vertical pack density in the uncured pack, (g) uniformity of vertical pack density in the cured pack, and (h) degree of cure in the cured pack;

an oven downstream from the fiberizing units for curing the binder in the pack; and a fluid control system for varying the rate of at least one liquid delivered at at least one fiberizing unit in response to a signal correlating to said feedback measurement.

The manufacturing system may further comprise a comparator or processor, such as a computer, to compare the feedback measurement to a stored target value and to generate a signal in response to the comparison. For example, the comparator may generate a signal conveying the magnitude and direction of deviation from the target, thus providing better guidance for control of the process. In some embodiments of the system, the fluid control system further comprises a plurality of control valves for independently setting the flow rate of coolant liquid delivered to the coolant dispensing system of each of the fiberizing units. This system may further comprise a plurality of meters for monitoring the independent flow rate of coolant liquid to each of the plurality of fiberizing units. Similar meters and control valves may optionally also be for provided for independently setting the flow rate of binder dispersions, binder diluent, and atomizing air or other fluid, or any or all of the above mentioned fluids.

In another aspect, the invention provides a process for making a fibrous product comprising:

attenuating a molten material into fibers at a plurality of fiberizing units associated with a conveyor moving in a machine direction, directing the fibers toward the conveyor to form a fibrous pack, spraying the fibers with at least one liquid selected from a coolant liquid, a binder diluent, a dispersion of curable binder and mixtures thereof, and curing the fibrous pack;

wherein the flow rate of at least one liquid sprayed onto the fibers is controlled to achieve liquid flow at or near the optimal level on an S-curve obtained for that product by plotting the ramp height against liquid flow.

In this aspect, the optimal level is above an inflection points where the first derivative reaches a maximum on the S-curve. In some embodiments, the optimal level is between the point where a second derivative exhibits a minimum and the point where the second derivative approaches zero again at higher flow. Although any fluid flow may be plotted and controlled using this S-curve, in some embodiments it is the flow of coolant liquid that is of greatest interest This invention relates to apparatus, systems and methods for monitoring and controlling the amount of moisture introduced into the forming hood area in the manufacture of mineral fiber insulation products so that the products have improved properties.

In another aspect, the invention comprises an apparatus for dispensing a liquid into a veil of fibrous mineral material being attenuated from a fiber spinner, the apparatus comprising:

a first array of a plurality of upper spray nozzles, the upper nozzles being fluidly connected to a source of liquid and having orifices for dispensing the liquid into the veil;

a second array of a plurality of lower spray nozzles, the lower nozzles being fluidly connected to the source of liquid and having orifices for dispensing the liquid into the veil;

wherein the first and second arrays are spaced apart from each other along the veil axis, the nozzles of each array being directed inwardly toward the veil.

One or both of the upper and lower arrays may be circular or annular rings with nozzles disposed on the ring. The spray nozzles may be of the same type or a different type, such as narrow angle "punch" spray or a wide angle dispersion spray. Further, the nozzles may be angled into the veil at the same or different angles; for example, the upper nozzles may be arranged at an angle relative to horizontal (or to the veil axis) that is lesser (or greater) than the angle of the lower nozzles. The liquid dispensed from the upper and lower nozzles may be mixed with other fluids. For example, the nozzles of either or both of the upper and lower arrays may be connected to a source of compressed gas, which is capable of atomizing the droplets of liquid as they are dispensed into the veil.

In an embodiment, the spray apparatus comprises: two substantially coaxial tubular rings spaced apart from one another, each of the rings having interiors connected via inlets to a source of liquid and connected via outlets to a plurality of nozzles having orifices for dispensing liquid into the veil. In some embodiments, at least some of the nozzles, typically all of them, are angled downwardly relative to a plane defined by the ring(s) to which said nozzles are attached to provide a downwardly directed spray trajectory; although the downward angle of the nozzles on one ring may differ from the angle of the nozzles on the second ring. Additionally, some nozzles may be configured as narrow angled or "punch" sprays, and others may be wide-angle sprays. In some embodiments, a third ring may be used to supply a compressed fluid such as air for atomizing the liquid dispensed from the first two rings. The rings are generally spaced apart and in approximately parallel planes circumscribing the fibrous veil.

In yet another aspect, the invention is directed to a method of making a fibrous product comprising;

attenuating molten material into fibers at a plurality of fiberizing units associated with a conveyor moving in a machine direction, and directing the fibers toward the conveyor to form a fibrous pack;

spraying the fibers with a dispersion of curable binder wherein the binder dispersion is mixed by diluting a binder concentrate with a binder diluent prior to spraying at least one fiberizing unit; and curing the binder in the pack.

In this aspect, the binder concentrate may be diluted at one fiberizing unit to a first dilution concentration and to a second dilution concentration that is not equal to the first dilution concentration at a second, different fiberizing unit. The binder concentrate may be diluted at a third or subsequent fiberizing unit to a third (or subsequent) dilution concentration that is not equal to the first or second dilution concentrations. In other words the dilution profile may vary from any one fiberizing unit to any other fiberizing unit. The profile may provide for increasing, decreasing or both increasing and decreasing dilutions, depending on the objectives; the first dilution concentration may be less dilute than the second dilution concentration or vice versa. The dilution profiles may change gradually or quickly in step fashion. The dilution profiles may impact only the amount of diluent provided at each fiberizing unit and not the amount of binder solids. Thus, the rate of binder chemical delivered to each fiberizing unit may still be substantially equal; or it too may be varied. In some embodiments, the flow of binder diluent is up to 100% higher at initial fiberizing units than at subsequent units; in some embodiments the flow of binder diluent is up to 50% higher at initial and last fiberizing units, and lower at intermediate fiberizing units; in still other embodiments, the flow of binder diluent is up to 20% lower at initial fiberizing units and then substantially constant at subsequent units. In some embodiments, the binder dispersion is sprayed by atomizing, either liquid or air atomizing at any individual fiberizer.

In yet another aspect, the invention relates to a fluid control system useful for making a fibrous product, said system comprising;

a plurality of fiberizing units associated with a conveyor, each fiberizing unit including: (a) a fiberizer adapted to form fibers from a source of molten material; (b) a blower for directing the fibers onto the conveyor to form a fibrous pack; and (c) at least one liquid dispensing system connected to a source of liquid for spraying the fibers with said liquid; and a plurality of control valves for setting the flow of liquid delivered by the liquid dispensing system of one fiberizing unit independently from the flow of the liquid delivered to the liquid dispensing system of a different fiberizing unit;

wherein the at least one liquid dispensing system is selected from systems for delivering coolant liquid, binder dispersion, binder diluent or combinations thereof.

The fluid control system of the invention may comprise at least first and second liquid dispensing systems connected to respective sources of first and second liquids for spraying the fibers with said liquids, and wherein each liquid dispensing system has a separate set of a plurality of control valves for setting the flow of liquid delivered by the liquid dispensing system of one fiberizing unit independently from the flow of the liquid delivered to the liquid dispensing system of a different fiberizing unit. The first and second liquid dispensing systems may be, for example, dispensing systems for a coolant liquid and a binder dispersion. Alternatively, the first and second liquids may be binder diluent and binder concentrate dispersion. Each apparatus may comprise from 2 to about 15 fiberizing units, each having at least first and second liquid dispensing systems connected to separate fluid control systems through a plurality of control valves. In some embodiments, the apparatus further comprises meters for monitoring the flow rate of each liquid to each of the fiberizing units. In some embodiments, the apparatus further comprises a plurality of nozzles at each fiberizing unit for dispensing liquids onto the fibers. Such nozzles may optionally be adapted for atomizing the liquids as they are dispensed, using either the liquid itself or a second atomizing fluid such as air.

In yet another aspect, the invention provides a method of making a fibrous product comprising;

attenuating molten material into fibers at a plurality of fiberizing units associated with a conveyor moving in a machine direction, and directing the fibers onto the conveyor to form a fibrous pack;

spraying the fibers with a dispersion of formaldehyde-free curable binder wherein the rate of binder delivery varies from one fiberizing unit to another; and curing the binder in the pack.

In yet another aspect the invention provides a method of improving the stiffness, vertical weight distribution or surface quality of a fiberglass insulation product, said method comprising;

attenuating molten glass into fibers at a plurality of forming units arranged serially over a conveyor moving in a machine direction, and directing the fibers toward the conveyor to form a fibrous pack;

spraying the fibers with a dispersion of formaldehyde-free curable binder wherein rate of binder delivery increases from a first fiberizing unit to a subsequent fiberizing unit; and curing the binder in the pack, wherein the fiberglass insulation product has at least one property selected from stiffness, vertical weight distribution or surface quality that is improved compared to a fiberglass insulation product manufactured in a process wherein the rate of binder delivery is constant at all fiberizing units.

In embodiments of the latter two aspects aspects, the delivery rate of binder at one fiberizing unit may differ from the delivery rate of binder at a second, different fiberizing unit without altering the total liquid delivered at the two fiberizing units. The delivery rate of binder (as contrasted with binder diluent in prior aspects) can be varied gradually across a plurality of fiberizing units to producing a gradual change in the binder delivery from a first fiberizing unit to a last fiberizing unit, or delivery rate of binder can be varied incrementally across a plurality of fiberizing units thereby producing stepwise change in the binder delivery from a first fiberizing unit to a last fiberizing unit. In either aspect, the delivery rate of binder may be reduced at a first fiberizing unit relative to the delivery rate at a last fiberizing unit; or it may be higher at a last fiberizing unit than at a first fiberizing unit. In some embodiments, the delivery rate of binder is higher at a last fiberizing unit than at an intermediate fiberizing unit, and higher at an intermediate fiberizing unit than at a first fiberizing unit. In the second-described aspect, the delivery rate of binder is generally varied to produce an increase in the binder delivery from a first fiberizing unit to a subsequent fiberizing unit, but the increase may be gradual or stepwise.

In the latter two aspects, the binder dispersion can be delivered by an air-atomized spray, or liquid atomized spray or both. In some embodiments, the binder dispersion may be delivered as a binder concentrate diluted with a binder diluent; and in this case, the binder can be delivered at profiled rates without altering the total amount of water delivered.

In yet another aspect, the invention provides a method of making a fibrous product comprising;

attenuating molten material into fibers at a plurality of fiberizing units associated with a conveyor moving in a machine direction, and directing the fibers onto the conveyor to form a fibrous pack;

spraying the fibers with an atomized stream of formaldehyde-free curable binder dispersion wherein the atomization breaks the binder stream into droplets and wherein the average size of the droplets varies from one fiberizing unit to another; and curing the binder in the pack.

In yet another aspect, the invention is directed to a method of reducing corrosion of downstream air components of a manufacturing process for making a fibrous product, the manufacturing process including attenuating molten material into fibers at a plurality of fiberizing units associated with a conveyor moving in a machine direction, and directing the fibers onto the conveyor to form a fibrous pack using negative pressure created by downstream air components including a suction fan; spraying the fibers with an atomized stream of formaldehyde-free curable binder dispersion; and curing the binder in the pack; the inventive method comprises:

atomizing the stream of binder dispersion at one fiberizing unit into an average droplet size that varies from the average droplet size atomized at a different fiberizing unit.

In the latter two aspects mentioned above, the average droplet size of the binder dispersion may be varied by altering at least one of the flow rate or pressure of the binder dispersion, or by altering at least one of the flow rate or pressure of an atomizing gas directed at the binder dispersion, or a combination of these four techniques. In some embodiments, the average droplet size is larger at initial fiberizing units than at subsequent fiberizing units. Although the number of fiberizing units may vary greatly from one manufacturing line to another, the initial fiberizing units may comprise at least the first 1 to 2 units, optionally the first 1 to 4 units. In many embodiments, the formaldehyde-free curable binder is an acidic binder, such as a polyacrylic acid binder or a natural or "bio-based" binder made with carbohydrates and acidic crosslinkers.

In yet another aspect, the invention relates to a method of making a fibrous product comprising;

measuring at least one of (a) the ambient temperature, and (b) the ambient humidity to obtain a model input measurement;

attenuating molten material into fibers at a plurality of fiberizing units associated with a conveyor moving in a machine direction, and directing the fibers toward the conveyor to form a fibrous pack;

spraying the fibers with spraying the fibers with at least one liquid selected from a vaporizable coolant liquid, a binder diluent, a dispersion of curable binder and mixtures thereof; wherein the flow rate of at least one liquid sprayed on the fibers is controlled in response to the model input measurement; and curing the binder in the pack.

In this method, the step of controlling the flow rate of at least one liquid may comprise adjusting the flow of coolant liquid, binder diluent, binder dispersion or any combination of these. As noted, the model input measurement may comprise measuring the ambient temperature, or the ambient humidity, or both. When measuring temperature, the step of controlling the flow rate of at least one liquid may comprise one or both of: (a) increasing the flow rate of a liquid in response to a model input signaling higher ambient temperature; and (b) decreasing the flow rate of a liquid in response to a model input signaling lower ambient temperature. When measuring humidity, the step of controlling the flow rate of at least one liquid may comprise one or both of: (a) increasing the flow rate of a liquid in response to a model input signaling lower ambient humidity; and (b) decreasing the flow rate of a liquid in response to a model input signaling higher ambient humidity.

In yet another aspect, the invention relates to a manufacturing system for making a fibrous product that utilizes these methods, said system comprising;

a plurality of fiberizing units associated with a conveyor movable in a machine direction, each fiberizing unit including: (a) a fiberizer adapted to form fibers from a source of molten material; (b) a blower for directing the fibers toward the conveyor to form a fibrous pack; (c) a liquid dispensing system for spraying the fibers with at least one liquid selected from a coolant liquid, a binder diluent, a dispersion of curable binder and mixtures thereof;

a sensor for measuring at least one of (a) the ambient temperature, and (b) the ambient humidity to obtain a model input measurement;

a fluid control system for varying the rate of at least one liquid delivered at at least one fiberizing unit in response to a signal correlating to said model input measurement; and an oven downstream from the fiberizing units for curing the binder in the pack.

The manufacturing system may further comprise a comparator or processor, such as a computer, to compare the model input measurement to a stored target value and to generate a signal in response to the comparison. For example, the comparator may generate a signal conveying the magnitude and direction of deviation from the target, thus providing better guidance for control of the process. In some embodiments of the system, the fluid control system further comprises a plurality of control valves for independently setting the flow rate of coolant liquid delivered to the coolant dispensing system of each of the fiberizing units. This system may further comprise a plurality of meters for monitoring the independent flow rate of coolant liquid to each of the plurality of fiberizing units. Similar meters and control valves may optionally also be for provided for independently setting the flow rate of binder dispersions, binder diluent, and atomizing air or other fluid, or any or all of the above mentioned fluids.

Various other aspects of this invention will become apparent to those skilled in the art from the following detailed description of the preferred embodiment, when read in light of the accompanying drawings.

DETAILED DESCRIPTION

Figure 1:
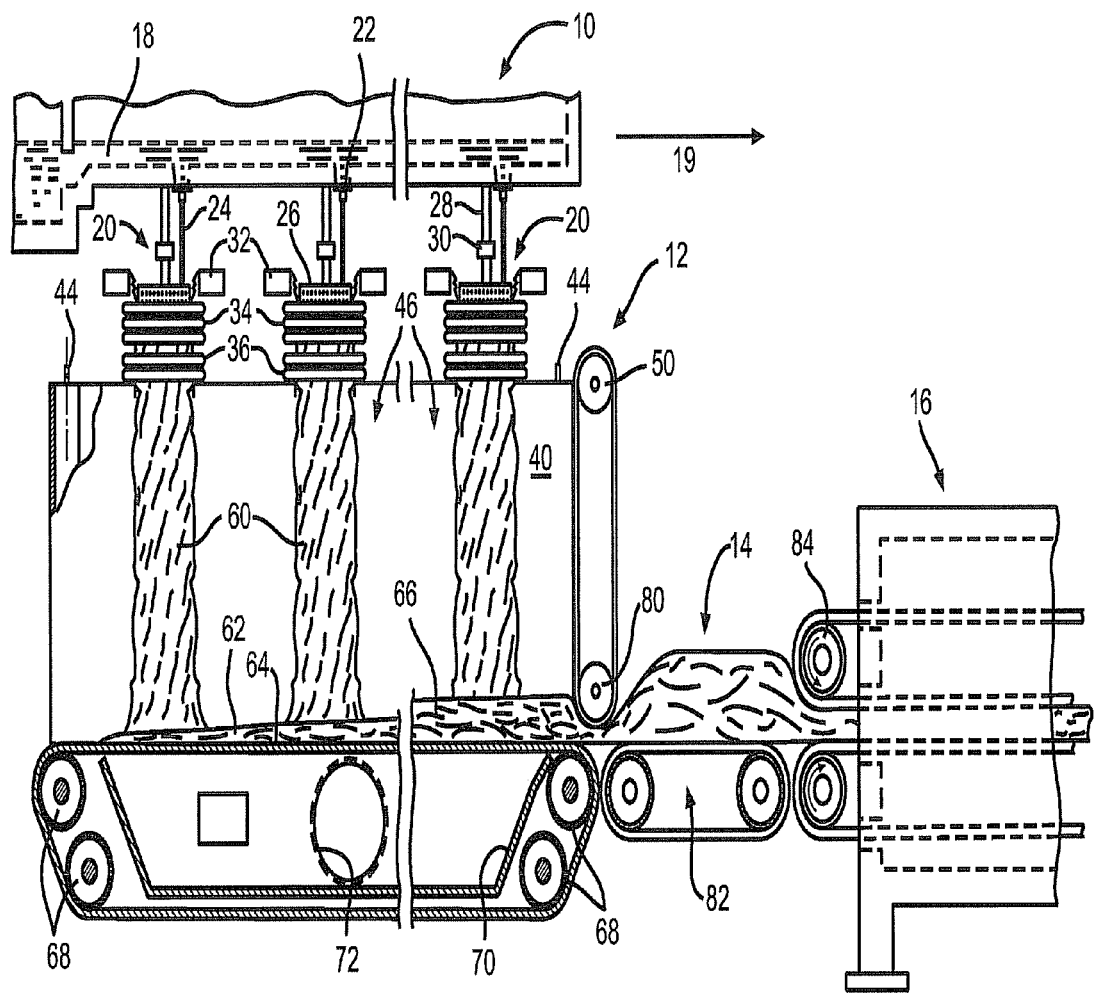
FIG. 1 is a partially sectioned side elevation view of a forming hood component of a manufacturing line for manufacturing fibrous products.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity.

Unless otherwise indicated, all numbers expressing ranges of magnitudes, such as angular degrees, quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. All numerical ranges are understood to include all possible incremental sub-ranges within the outer boundaries of the range. Thus, a range of 30 to 90 degrees discloses, for example, 35 to 50 degrees, 45 to 85 degrees, and 40 to 80 degrees, etc.

"Mineral fibers" refers to any mineral material that can be melted to form molten mineral that can be drawn or attenuated into fibers. Glass is the most commonly used mineral fiber for fibrous insulation purposes and the ensuing description will refer primarily to glass fibers, but other useful mineral fibers include rock, slag and basalt.

"Product properties" refers to a battery of testable physical properties that insulation batts possess. These may include at least the following common properties:

"Recovery"—which is the ability of the batt or blanket to resume its original or designed thickness following release from compression during packaging or storage. It may be tested by measuring the post-compression height of a product of known or intended nominal thickness, or by other suitable means.

"Stiffness" or "sag"—which refers to the ability of a batt or blanket to remain rigid and hold its linear shape. It is measured by draping a fixed length section over a fulcrum and measuring the angular extent of bending deflection, or sag. Lower values indicate a stiffer and more desirable product property. Other means may be used.

"Tensile Strength"—which refers to the force that is required to tear the fibrous product in two. It is typically measured in both the machine direction (MD) and in the cross machine direction ("CD" or "XMD").

"Lateral weight distribution" (LWD or "cross weight")—which is the relative uniformity or homogeneity of the product throughout its width. It may also be thought of as the uniformity of density of the product, and may be measured by sectioning the product longitudinally into bands of equal width (and size) and weighing the band, by a nuclear density gauge, or by other suitable means.

"Vertical weight distribution" (VWD)—which is the relative uniformity or homogeneity of the product throughout its thickness. It may also be thought of as the uniformity of density of the product, and may be measured by sectioning the product horizontally into layers of equal thickness (and size) and weighing the layers, by a nuclear density gauge, or by other suitable means.

Of course, other product properties may also be used in the evaluation of final product, but the above product properties are ones found important to consumers of insulation products.

Unless otherwise defined, "vapor" and "water vapor" are used interchangeably to refer to coolant or binder diluent liquid, typically water, in a gaseous phase.

Manufacturing System Overview

FIG. 1 illustrates a glass fiber insulation product manufacturing line including a forehearth 10, forming hood component or section 12, a ramp conveyor section 14 and a curing oven 16. Molten glass from a furnace (not shown) is led through a flow path or channel 18 to a plurality of fiberizing stations or units 20 that are arranged serially relative to a conveyor 64 that is moveable in a machine direction, as indicated by arrow 19 in FIG. 1. At each fiberizing station, bushings or holes 22 in the flow channel 18 allow a stream of molten glass 24 to flow into a spinner 26, which may be heated by a burner (not shown). Fiberizing spinners 26 are rotated about a shaft 28 by motor 30 at high speeds such that the molten glass is forced to pass through tiny orifices in the circumferential sidewall of the spinners 26 to form primary fibers. Although spinners 26 are shown as the fiberizing unit in the present embodiments, it will be understood that other types of fiberizing units may be used with the invention.

Blowers 32 direct a heated gas stream, typically air, in a substantially downward direction to impinge the fibers, turning them downward and attenuating them into secondary fibers that form a veil 60 that is forced downwardly in the direction of a conveyor 64. The fibers may be distributed in a cross-machine direction by mechanical or pneumatic "lappers" (not shown), eventually forming a fibrous layer 62 on a porous conveyor 64. The layer 62 gains mass (and typically thickness) with the deposition of additional fiber from the serial fiberizing units, thus becoming a fibrous "pack" 66 as it travels in a machine direction 19 through the forming area 46.

One or more cooling rings 34 spray coolant liquid, such as water, on veil 60 to cool the forming area and, in particular, the fibers within the veil. Other coolant sprayer configurations are possible, of course, but rings have the advantage of delivering coolant liquid to fibers throughout the veil 60 from a multitude of directions and angles. A binder dispensing system includes binder sprayers 36 to spray binder onto the veil 60. Suitable coolant spray rings and binder spray rings are disclosed in US Patent Publication 2008-0156041 A1, to Cooper, incorporated herein by reference. A specific sprayer ring is discussed below in connection with FIGS. 3 and 4. Each fiberizing unit 20 thus comprises a spinner 26, a blower 32, one or more cooling liquid sprayers 34, and one or more binder sprayers 36. FIG. 1 depicts three such fiberizing units 20, but any number may be used. For insulation products, from two to about 15 units, typically 3 to about 12 units, may be used in one forming hood component for one line.

In addition to the forming hood components described above, the "downstream air components" have the primary purpose of creating and maintaining a negative pressure below the chain or conveyor 64 in order to draw through the air injected to the forming area 46 by blowers 32. The "downstream air components" thus include the air handling system downstream from the conveyor 64, including the conveyor 64 itself. Note that "downstream" here refers to the direction of airflow, not the machine direction 19. Conveyor 64 is porous and may also include two flights 64A and 64B. Upper flight 64A travels in the machine direction 19, revolves about one or more rollers 68 to lower flight 64B which revolves about further rollers 68 to complete the belt. Other downstream air components are found beneath the upper flight 64A of conveyor chain 64. Here, one or more suction boxes 70 are connected via duct 72 to a drop out box 74 (refer to FIG. 5). Dropout box 74 is just one type of particle separator that decelerates the air flow to allow particulates to fall and separate from the air stream. Other particle separators might include cyclonic separators, demisters and the like. Further downstream, a forming fan or blower 76, and its housing, ultimately provide the negative pressure in the suction box 70 that aids in removing air entering the forming area 46 to reduce turbulence. The downstream air components also include further ductwork, such as duct 72 leading to fans or blowers (not shown), drop out boxes, separators, and the ultimate discharge stack.

As the conveyor chain 64 rotates around its rollers 68, the uncured pack 66 exits the forming section 12 under exit roller 80, where the absence of downwardly directed airflow and negative pressure (optionally aided by a pack lift fan, not shown) allows the pack to regain its natural, uncompressed height or thickness. A subsequent supporting conveyor or "ramp" 82 leads the uncured fibrous pack toward a curing oven 16 and between another set of porous compression conveyors 84 for shaping the pack to a desired thickness for curing in the oven 16. Upon exit from the oven 16, the cured pack or "blanket" (not shown) is conveyed downstream for cutting and packaging steps. For some products, the blanket is split longitudinally into multiple lanes and then chopped into shorter segments known as "batts." These may be bundled or rolled for packaging.

Figure 2:
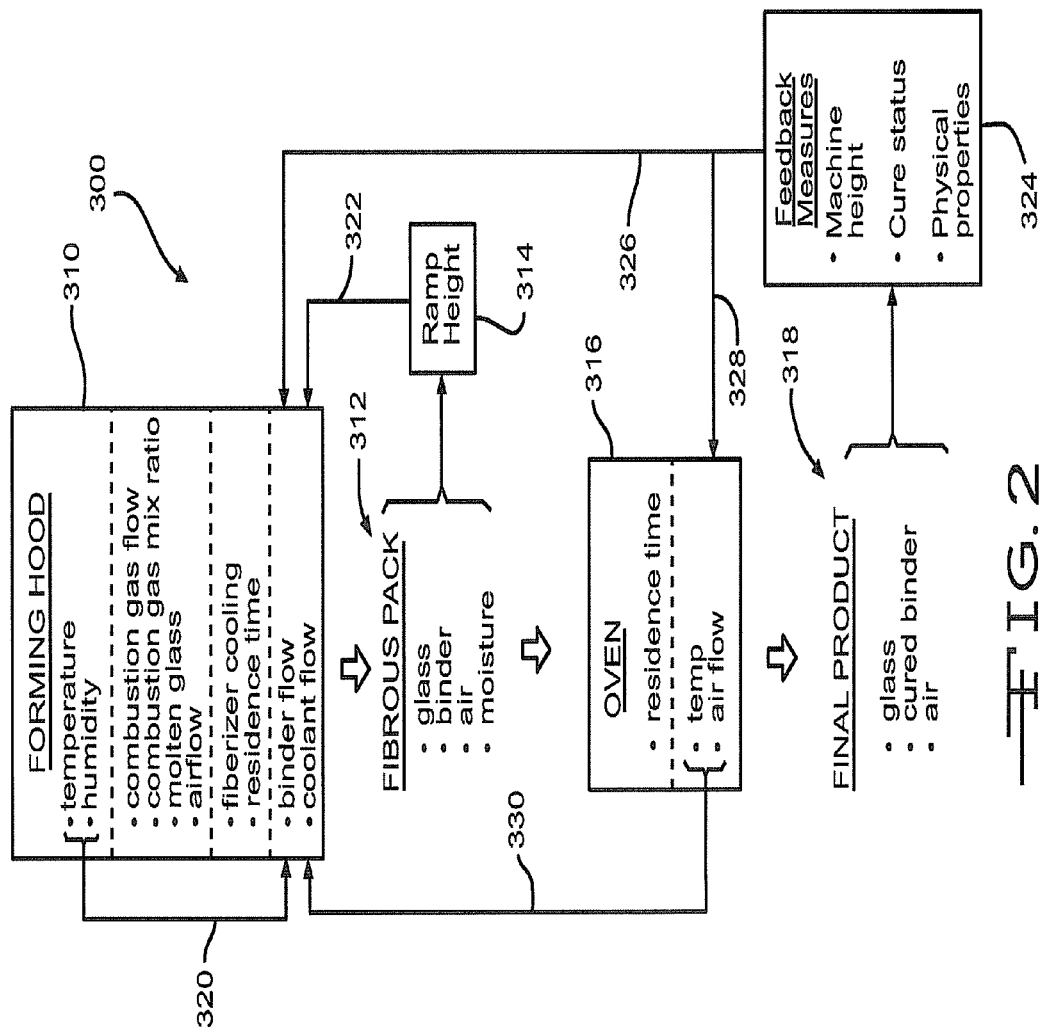
FIG. 2 is a schematic representation illustrating the major forming hood and oven energy factors and feedback loops that influence vaporization energy balance and product properties.

The forming hood section or component 12 is further defined by at least one hood wall 40, and usually two such hood walls on opposing sides of the conveyor chain 64 to define a forming chamber or area 46. For clarity in FIG. 1, the hood wall 40 is depicted on only one side (behind conveyor chain 64), and a portion of the wall 40 on the left end is removed to reveal a roller 42. Typically, each of the hood walls 40 takes the form of a loop or belt having an inward-directed flight and an outside flight. The inward-directed flight defines a sidewall of the forming area 46 and moves through the forming area by rotating about vertical rollers 42; while the outside flight closes the loop outside of the forming area 46. End walls 48 (one shown at the right end of the forming area 46) of similar belt construction may further enclose the forming area 46 with an inward facing flight 48A and an outward return flight 48B. As shown in FIGS. 1 and 2, however, the rollers 50, 80 for the end wall 48 may be oriented transversely compared to the rollers 42. A similar end wall (not shown) may be present on the left end of the forming area 46. The terms "forming hoodwall," "hoodwall" and "hood wall" may be used interchangeably herein to refer to the wall(s) that define and enclose the forming area 46.

Mass and Energy Balance Model

Although the use of cooling water sprays for cooling a glass veil prior to application of binder has been described in the past (see e.g. U.S. Pat. No. 5,601,629 to Helbing) and the use of ramp moisture sensors to provide a feedback mechanism to the forming operation process has also been described (see e.g. U.S. Pat. No. 7,435,444 to Freeman, et al.), there remains a need for a more rigorous analysis of the relationships amongst all the variables. A portion of FIG. 2 represents a Mass and Energy Balance model 300 and it illustrates some of the key variables or factors that impact the forming and curing operations in the manufacture of fibrous insulation.

Block 310 represents the forming hood area 46 and some key inputs and outputs for the forming operation. As noted above, molten glass enters from the fiberizing units 20, and the fiberizing units themselves are internally cooled with a fiberizer cooling liquid. The primary fibers exiting the spinners 26 are heated with a combustion gas fuel mixed with air, typically in a fuel-lean mix ratio that is monitored by the residual oxygen content and adjusted as necessary. Those primary fibers are then attenuated and directed substantially downward by the air from the blowers 32. Another potential source of air flow is the pneumatic lappers describe above. However, the most important source of airflow—by orders of magnitude—is the obligatory entrained or induced ambient air drawn into the forming hood by the suction box 70. All sources of air introduced into the forming hood bring associated temperature and humidity properties, but the impact of this is greatest with the induced ambient air. The forming hood area 46 also receives a flow of coolant liquid from sprayers 34 and binder from sprayers 36, and all this takes place for a residence time dependent on the size of the forming area and the line speed. The factors of block 310 are listed in groups that approximately represent a manufacturer's ability to control them. For example, controlling binder flow and coolant flow is easier than controlling residence time, which is easier than controlling combustion parameters, glass or airflow, which is easier than controlling ambient temperature and humidity.

The result is an uncured fibrous pack (noted at 312 in FIG. 2) containing glass fibers, binder, some air space and moisture. These factors in turn define the "ramp height" i.e. the thickness of the uncured pack as it leaves the forming area, as represented by block 314; as well as a moisture content property of the pack on the ramp.

The pack feeds into a curing oven, represented by block 316, and resides there for a residence time dependent on line speed and oven length, and is subjected to an air flow at elevated temperatures to cure the binder in the pack. The final product or "blanket" (noted at 318 in FIG. 2) that exits the oven has eliminated essentially all the moisture and consists of glass, cured binder and air. The blanket possess certain measurable features, some of which are listed in block 324, including thickness or "machine height," cure status, and physical properties like loft recovery, stiffness/sag, and density uniformity, which includes vertical weight density (VWD) and lateral weight density (LWD), all of which are described above.

Moisture entering the forming area 46 thus arises from five potential sources. First, water is used to create a first aqueous dispersion or binder concentrate as discussed below. A second source of water potentially enters when a binder concentrate is diluted with an aqueous "diluent" as is also discussed below. A third source of water enters when a separate coolant liquid is sprayed to cool fibers and veil environment. A fourth source of moisture comes from the local conditions of humidity and temperature—especially of the induced air—which, in turn, may depend on weather patterns and conditions, washwater in the vicinity and other localized ambient parameters. Finally, a fifth source of moisture in the forming area is water produced as a product of combustion. Some moisture is needed in the pack so it can recover its loft upon exiting the forming hood. However, the more moisture used in forming the fibrous pack 312, the more energy is required to remove it in the drying and curing oven 316, so the use of excessive moisture in the forming hood has generally been avoided.

With regard to ambient humidity, there are multiple ways to measure humidity, some measuring absolute or specific humidity, others measuring humidity ratio or relative humidity. In addition, well known psychrometric charts are available that can produce a humidity measure (either absolute or relative) based on other factors, such as dry bulb temperature; wet bulb temperature; dewpoint temperature; enthalpy; saturation temperature; and specific volume. With any two of these factors known, it is possible to determine a humidity measure useful in the model. Unless specified to be "relative" or "specific," the term "ambient humidity" as used herein as a model input is a general term that encompasses any of the foregoing psychrometric factors.

Some or even most of these sources of moisture may be utilized along with airflow to balance or offset the heat energy brought into the forming hood by the hot glass and combustion gasses. This is desirable so that binder viscosity remains low enough, and it is accomplished primarily by transferring that heat energy into a heat of vaporization of the water or moisture. Although ambient conditions (primarily temperature and humidity) may be difficult to control, the model suggests that information about ambient conditions can be used in a compensation process (represented by arrow 320 in FIG. 2). Other factors being equal, an increase in ambient humidity or a decrease in ambient temperature in the forming area decreases the vapor pressure, and hence the driving force for evaporation, thereby requiring less coolant moisture as compensation. Conversely, a decrease in ambient humidity or an increase in ambient temperature increases the vapor pressure, and hence the driving force for evaporation, thereby requiring more coolant moisture as compensation. As noted above, besides ambient and combustion moisture, there are three other potentially controllable sources of moisture to adjust (binder, binder diluent and coolant), although coolant liquid/water is the most effective, as described below. Initial levels of any of these controllable moisture sources may be set or adjusted in order to compensate for changes in ambient conditions.

With reference still to FIG. 2, the factors of the fibrous pack 312 define the ramp height 314. This information is useful as feedback information (line 322) for fine tuning the moisture input into the forming hood 46, as is discussed further below. In a similar manner, the feedback measures (box 324, e.g. thickness or "machine height," cure status and/or physical properties) of the blanket can provide feedback information (line 326) to the forming area 46 and/or the oven 316 (via feedback information line 328). As with the forming hood 310, the factors of the oven 316 are presented approximately in reverse order of controllability; i.e. oven temperature and airflow are easier to control than residence time, once a line speed and oven length have been dictated. Finally, if a final product feedback measure, such as a cure status of "undercured," sends feedback 328 suggesting an increase in oven temperature or airflow but they are already constrained at maximum capacity, the oven can send feedback (line 330) to the forming hood area to reduce moisture input or other process change.

The model described above may be used to estimate how much coolant liquid is required to offset the incoming heat energy, including energy coming from the ambient conditions, by means of evaporative heat transfer to the coolant liquid. The large majority of the coolant liquid is used for this purpose, only a very small fraction remaining as moisture in the pack when it leaves the forming hood area. Ideally, moisture from the coolant liquid is preferentially evaporated over the moisture found in the binder dispersion. This is achieved by positioning of the respective sprayers and by the relative amounts of coolant liquid and binder liquid, as discussed herein.

Binders

"Binders" are well known in the industry to refer to thermosetting organic agents or chemicals, often polymeric resins, used to adhere glass fibers to one another in a three-dimensional structure that is compressible and yet regains its loft when compression is removed. Phenolic and formaldehyde binders have been used in the past, but have been associated with environmental concerns. Some manufacturers have attempted to manage noxious emissions via the use of formaldehyde-free binder systems. Such formaldehyde-free binder systems to date employ an acidic binder comprising a polycarboxylic acid and a polyhydroxyl compound. One example of a formaldehyde-free binder composition is the polyacrylic acid plus maleic acid (PAT/MA) binder system described in U.S. Pat. Nos. 6,884,849 and 6,699,945 to Chen, et al. Some polyacrylic binder systems utilize glycerol (PAG) or triethanolamine (PAT) as the polyhydroxyl compound. Other approaches to formaldehyde-free resins include binders made from natural starches (or dextrins, maltodextrins or other polysaccharides of varying length) and polyfunctional carboxylic acids like citric acid (MD/CA), such as those disclosed in commonly owned U.S. patent application Ser. No. 12/900,540, filed Oct. 8, 2010, all incorporated by reference. These carboxylic acid-based binder systems, however, are best employed at low pH, for example, less than about pH 3. Variations in pH of as little as 0.3 can result in poor curing of the binder composition. This, in turn, results in glass fiber products which exhibit poor performance upon curing.

References to "acidic binder" or "low pH binder" mean a binder having a dissociation constant (Ka) such that in an aqueous dispersion the pH is less than 7, generally less than about 6, and more typically less than about 4.

"Binder delivery" refers to the mass or quantity of "binder chemical" e.g. "binder solids" delivered to the glass fibers. This is typically measured in the industry by loss on ignition or "LOI," which is a measure of the organic material that will burn off the fibrous mineral. A fibrous pack is weighed, then subjected to extreme heat to burn off the organic binder chemical, and then reweighed. The weight difference divided by the initial weight (×100) is the % LOI.

As solids, rate of binder delivery is properly considered in mass/time units, e.g. grams/minute. However, binder is typically delivered as an aqueous dispersion of the binder chemical, which may or may not be soluble in water. "Binder dispersions" thus refer to mixtures of binder chemicals in a medium or vehicle and, as a practical matter, delivery of binder "dispersions" is given in flow rate of volume/time. e.g. liters/minute or LPM of the dispersion. The two delivery expressions are correlated by the mass of binder per unit volume, i.e. the concentration of the binder dispersion. Thus, a binder dispersion having X grams of binder chemical per liter flowing at a delivery rate of Z liters per min delivers X*Z grams/minute of binder chemical. Depending on the solubility and particle size of the binder, dispersions may include true solutions, as well as colloids, emulsions or suspensions.

One specific type of binder dispersion—referred to as a "binder concentrate"—is a stock dispersion having a relatively high, fixed concentration, e.g. 20-40%, of binder solids that can be subsequently diluted with a binder "diluent" (typically more water) to produce a diluted "binder dispersion" having a lower concentration, e.g. 10%, of binder. This diluted, "ultimate" binder dispersion is then sprayed or dispensed on the glass fibers. A constant delivery of binder chemical (grams/minute) may still be achieved by a higher flow rate of a more dilute binder dispersion. The term "binder dispersion" is generic for both the ultimate, diluted form "as sprayed" and the concentrated stock form. Binder dispersions of 25-30% solids may be used for some commercial products, while binder dispersions of 5-15% solids may be used for other products, such as residential products. Binder tackiness and viscosity in the forming hood are important properties impacting product properties, and are dependent on the concentration (% solids), the particular binder chemistry and the temperature.

Fluid Dispensing System

A fluid dispensing system comprises a first array of a plurality of upper spray nozzles, the upper nozzles being fluidly connected to a source of liquid and having orifices for dispensing the liquid into the veil; and a second array of a plurality of lower spray nozzles, the lower nozzles being fluidly connected to a source of liquid and having orifices for dispensing the liquid into the veil; wherein the first and second arrays are spaced apart from each other along the veil axis, the nozzles of each array being directed inwardly toward the veil. The nozzles may optionally also be connected to a source of compressed gas for atomization as discussed below. In some embodiments, the nozzle axes are directed downwardly as described below. The nature of the structure that supports these arrays and delivers liquids and/or compressed gas to the nozzles is not critical provided it does not impede the flow of the veil. A specific embodiment is described in detail herein.

Figure 3:
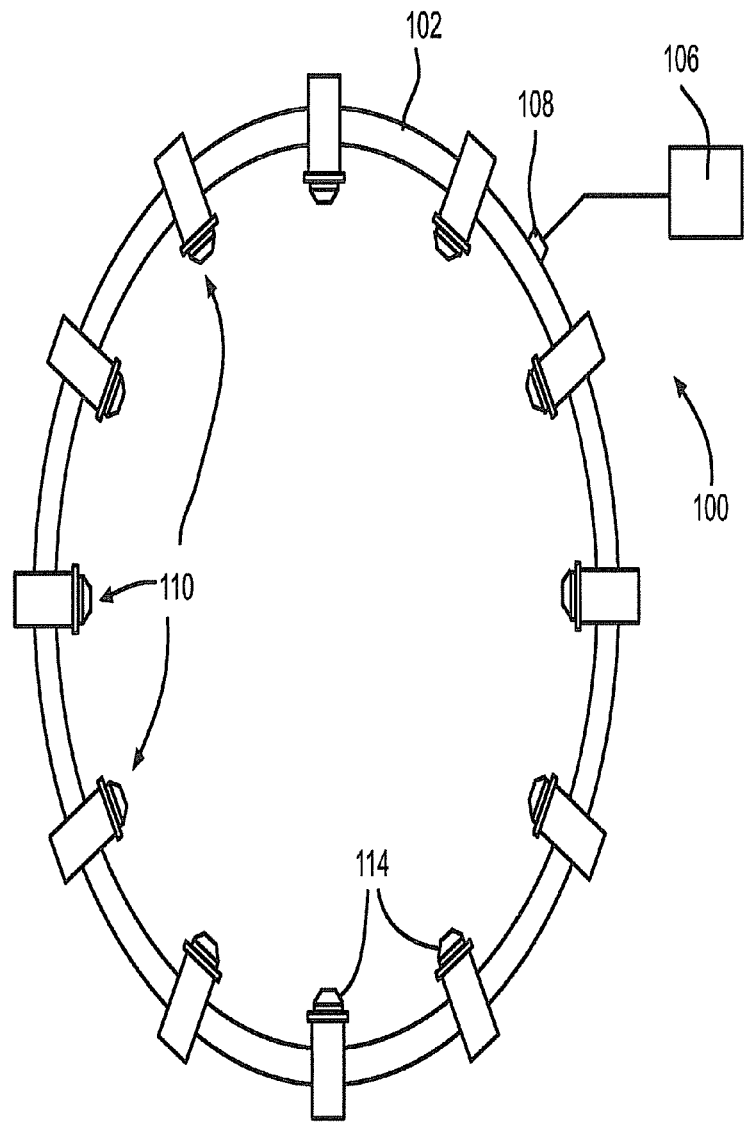
FIG. 3 is a top plan view of a typical liquid dispensing ring.
Figure 4:
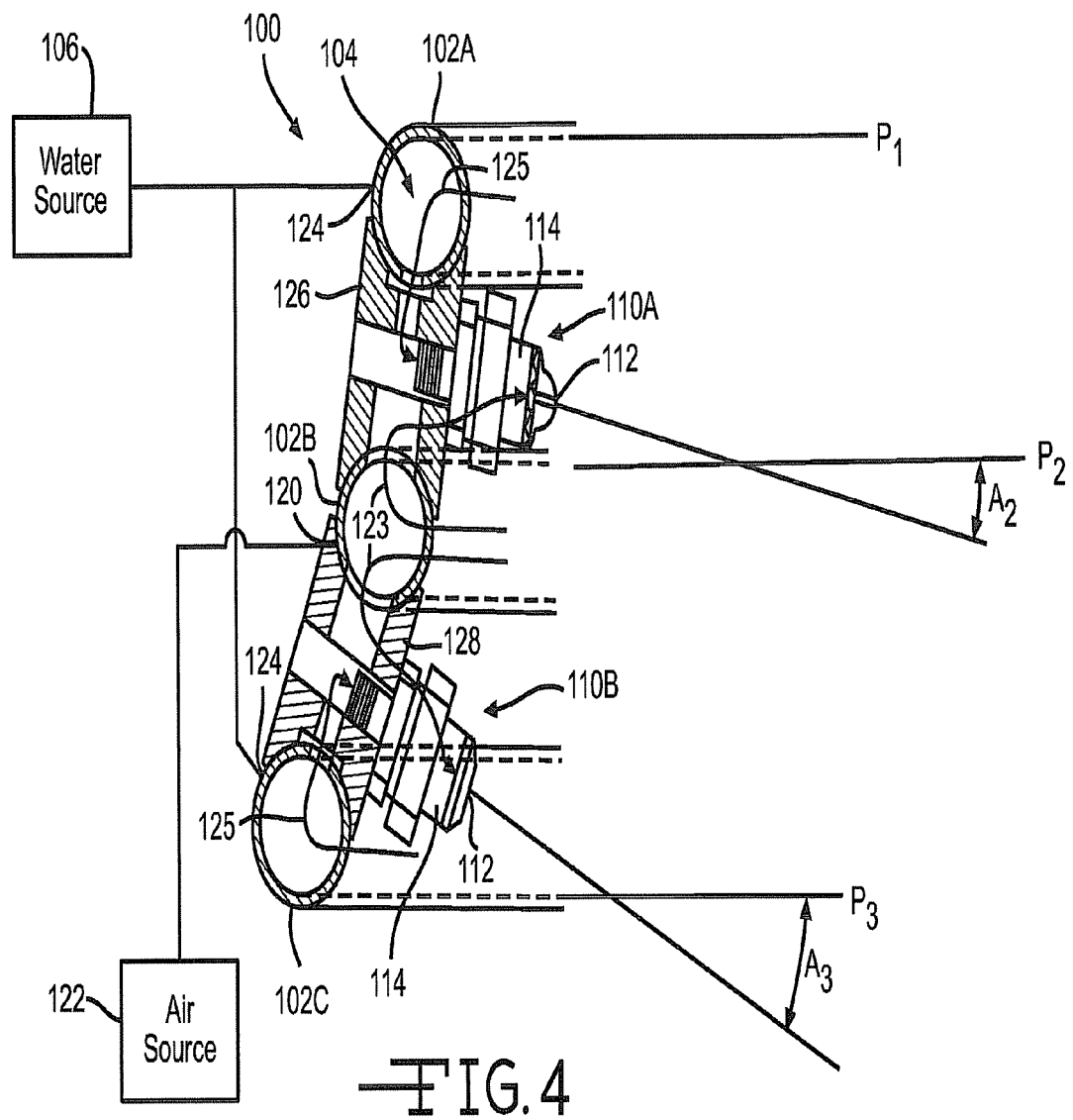
FIG. 4 is a partially cross-sectional side view of a liquid dispensing ring in accordance with the invention.

Referring now to FIGS. 3 and 4, a specific binder or coolant ring system 100 is shown. One or more tubular rings 102 is formed defining an annular interior 104 that is in fluid communication with a source of liquid 106 via a ring inlet 108. For simplicity, the ring is tubular, although any cross-sectional area is possible. The ring 102 defines generally a ring plane that is typically oriented perpendicular to the axis of the downwardly flowing veil 60 of glass fibers, however, the terms "plane" and "perpendicular" should be interpreted as only approximately so. The ring 102 includes a plurality of jets or nozzles 110 that are in fluid communication with the ring interior and spray liquids inwardly onto the glass veil. The sprayed liquid is typically a coolant liquid, like water for example, or an aqueous binder dispersion, or both.

FIG. 4 illustrates one embodiment of a liquid dispensing system 100, which may be used for binder dispersion and/or coolant liquid. Coolant water is described herein as an exemplary liquid. The system 100 comprises an apparatus of three tubular rings, 102A, 102B, and 102C, arranged coaxially, but spaced apart from one another. The rings are each spaced apart from the others a distance in the range of about 1 to about 6 inches, more typically about 2 to about 5 inches. The centers of the tubular cross-sections define three approximately parallel planes; planes parallel to the ring planes but situated at the circumfery of the tubes are designated P1, P2 and P3 in FIG. 4. Each tubular ring defines an annular interior space 104. The intermediate ring 102B of the three coaxial rings is connected via an inlet 120 (shown schematically) to a source 122 of compressed gas, typically compressed air. The upper and lower rings (102A and 102C) are connected via an inlet 124 (shown schematically) to a source 106 of coolant liquid, e.g. water.

Bridging the upper ring 102A and middle ring 102B are a plurality of supporting blocks 126 to which are mounted first or upper nozzles 110A (one shown) having a nozzle or orifice axis directed inwardly toward the axis of the rings. Bridging the middle ring 102B and lower ring 102C are a plurality of supporting blocks 128 to which are mounted second or lower nozzles 110E (one shown) also having an orifice or nozzle axis directed inwardly toward the axis of the rings. The supporting blocks 126, 128 may extend annularly around the ring or they may exist only at the locations of nozzles and be discontinuous elsewhere around the ring. In fact, in its broadest configuration, rings are not required at all; they are merely a convenient means for supporting and delivering fluids to the arrays of upper and lower nozzles.

In the embodiment shown, the diameter of the middle ring 102B is slightly larger than the diameter of the upper ring 102A, causing the supporting blocks 126 and the first nozzles 110A to angle downwardly such that the angle A2 between the first nozzle orifice axis and plane P2 is approximately 10 degrees. This angle A2 may vary in a range from about 0 to 20 degrees, or from about 5 to about 15 degrees. Similarly, the diameter of the lower ring 102C is slightly larger than the diameter of the middle ring 102B, causing the supporting blocks 128 and the second nozzles 110B to angle downwardly such that the angle A3 between the second nozzle orifice axis and plane P3 is approximately 25 degrees. This angle may vary in a range from about 15 to 40 degrees, or from about 15 to about 30 degrees. It should be understood that varying the diameter of the rings 102 is just one way to achieve a downward angle for the axes of nozzles 110A, 110B, and other means are possible. For example, the rings 102 might all be the same diameter and the mounting blocks 126, 128 might contain angled faces into which the nozzles 110 are mounted. In general however, the upper ring nozzles 110A deflect downward at somewhat lesser angles than the lower ring nozzles 110B.

The number of first nozzles 110A and supporting blocks 126 associated with the upper ring 102A may range from about 3 to about 12, more typically from about 6 to 10. The spray pattern of the first nozzles 110A, as defined by selection of the air cap 114 and nozzle configuration, may all be identical or different. The number of second nozzles 110B and supporting blocks 128 associated with the lower ring 102C may range from about 3 to about 12, more typically from about 6 to 10. The spray pattern of the second nozzles 110B, as defined by selection of the air cap 114 and nozzle configuration, may all be identical or different. In some embodiments, the spray pattern of at least some of the first nozzles 110A will differ from the spray pattern of at least some of the second nozzles 110B. For example the first or upper nozzles 110A may include wide angle or flat sprays well adapted to quickly cool the external fibers in the veil 60 and the lower or second nozzles may include narrow angle or punch sprays well adapted to cool the interior environment of the veil 60.

The operation of one such nozzle is described in detail below, it being understood that the operation of each nozzle is essentially the same. Coolant water (or, alternatively, a binder dispersion) is pressurized or pumped from a source 106 via lines to the inlet 124 of the upper and lower rings 102A, 102C, which is open to the interior 104 of the rings so that liquid is distributed throughout the upper and lower rings. Supporting blocks 126 and 128 include internal liquid bores or passages open to the annular interior 104 of the upper and lower rings, and leading to a central orifice of the nozzles and to the nozzle exit 112 as shown schematically by arrows 125. Compressed gas (air) is led from a source 122 via lines to the inlet 120 of the middle ring 102B, which is open to the annular interior of the ring so that air is distributed throughout the middle ring. Supporting blocks 126, 128 include internal air passages open to the interior of the middle ring 102B, and leading via nozzle bores (not shown, but represented schematically by arrows 123) to an annular space in the air cap 114 near the exit 112 of the central orifice of the nozzles 110. Here the compressed air is allowed to mix with coolant water at each of the first nozzles 110A and second nozzles 110B to atomize the water into small droplets or particles. The internal air passages and internal liquid passages of the supporting blocks 126, 128 are distinct so that air and coolant water are not allowed to mix in the supporting block. Air and liquid may mix within the nozzle ("internal-mix") or after the liquid exits the nozzle orifice ("external-mix"), depending on the type of nozzle selected. Upon leaving the nozzle, the coolant liquid is dispensed in small particles or droplets into the glass veil 60, which is disposed within the concentric ring system 100.

Air-atomized, external-mix nozzles have been found to be suitable for spraying liquids onto fibers in accordance with the invention. These nozzles have a central orifice and exit 112 for passage of the liquid to be delivered, and bores leading to an annular space within an air cap 114 around the liquid exit 112. Air and liquid are not mixed until the liquid has exited the nozzle orifice, giving better control over the size of the droplets. Air caps 114 may be selected to shape the distribution of liquid: for example, narrow angle punch sprays, wide angle sprays, flat sprays, etc. Such nozzles are well known to those skilled in the art.

When the dispensing system described above is used for coolant liquids, a second dispensing system, the same or different, is used for binder dispersion. Typically the coolant dispensing system is located above the binder dispensing system to maximize cooling of the forming hood environment prior to application of the binder dispersion. This is desirable since the binder viscosity is sensitive to temperature, and product properties are sensitive to binder viscosity.

Atomization

It is advantageous to cool the fibers quickly—i.e. to create a very steep temperature gradient curve from fiber formation to binder application. Not only does the binder behave better (less evaporation and viscosity change), but also the air being pulled through the pack on the conveyor is of more uniform temperature and leads to fewer wet spots and more even weight distribution. The temperature of the fibers on formation may be as high as 1600-2000 F, which can drop about 50% by the time they are attenuated by the downward blower. This is still quite hot for binder application, so the coolant water is applied to quickly cool the veil of fibers (both inside and outside) and surrounding air environment to about 300 to 600 F or from about 400 to 550 F for preferred temperature for binder application. This large temperature drop occurs across a distance that may be as little as 12 inches, resulting in a very steep gradient.

The total amount of heat that can be removed from the molten fibers and forming hood environment is function of the heat of vaporization of the coolant liquid and the mass that is introduced into the forming hood. However, the rate of this heat removal reaction—i.e. its efficiency—is at least partly a function of the total surface area of cooling droplets that is available to collide with hot fibers or air molecules. Thus, increasing the surface area/mass ratio of the coolant droplets is a way to achieve comparable evaporative cooling with less coolant mass. Said another way it accelerates the evaporative cooling reaction. Conversely, decreasing the surface area/mass ratio of the coolant droplets decreases the efficiency of the evaporative cooling.

The coolant liquid flow rate can be maintained (or varied) to control the total heat transfer possible (per unit of time). But varying droplet size from one nozzle to another, or from one fiberizer unit to another, enables control of the surface area/mass ratio, thereby controlling the efficiency of evaporative heat transfer at various nozzles/fiberizing units. This is important because one may wish to cause evaporative heat transfer more quickly at initial fiberizing units to reduce the risk of binder being volatilized, pre-cured or rendered so viscous that it causes emissions problems or downstream component problems or product property problems. Alternatively, one may wish to reduce the coolant flow rate at subsequent fiberizer units without sacrificing evaporative transfer to minimize total water input. Either is possible with the present invention which enables differential control of droplet size. Droplet size may be controlled through differential air atomization or differential liquid stream pressure, or both.

In some embodiments, the nozzles 110 delivering the liquid are atomizing nozzles that deliver small droplets of liquid. "Atomization" and "atomize" refer to the process of using a force, typically fluid pressure, to break up a liquid stream into smaller sized droplets or "particles." The fluid exerting the pressure may be the liquid itself, in which case the process is "liquid pressure atomization" or "LP atomization" and the average diameter of the droplets or particles typically ranges from about 50 to about 300 microns for water. For LP atomized binder dispersions, droplet size may vary from about 100 to about 600 microns, more likely from about 150 to about 400 microns. Alternatively, the fluid pressure may be supplied by a separate fluid/gas, typically air, in which case the process is "air atomization" and the average diameter of the droplets or particles can range from about 5 to about 100 microns for water, more likely from about 10 to about 50 microns. For air atomized binder dispersions, droplet size may vary from about 10 to about 300 microns, more likely from about 30 to about 150 microns.

Atomized droplet size is dependent on several factors: (1) the dimensions and configuration of the nozzle itself; (2) the liquid viscosity and surface tension; (3) fluid flow rates (both of the liquid stream and the atomizing fluid/gas); and (4) fluid pressures (both of the liquid stream and the atomizing fluid/gas). The fluid flows and pressures are preferential controls once the other factors are dictated or fixed. It should be understood that atomization generally produces a broad distribution of droplet sizes and that accurate measurement of the diameter of the droplets is difficult. Two commonly-used definitions of "droplet size" are not strictly average diameters, but rather are dimensions determined, for example, by the ratio of surface area to volume (the "Sauter mean diameter"); or the diameter of a drop that is median in a distribution of drop volumes (the "volume median diameter"). Often the two will vary, the volume median diameter typically exceeding the Sauter mean diameter. Given these difficulties, it is customary in the field to rely on nozzle manufacturers' proprietary data for estimates of the mean droplet diameters that are produced by specific nozzles under specific conditions of fluids and pressure ranges. As used herein "average droplet size" encompasses any of these typical measures of central tendency.

Importantly, the choice of droplet size involves tradeoffs. For a given initial velocity, larger droplets have greater mass and therefore greater momentum; but suffer from smaller surface area/mass ratios. In contrast, smaller droplets have lesser mass and momentum, and greater surface area/mass ratios. In some circumstances, such as for binder dispersions at initial fiberizing units, and for veil penetration, larger droplets may be better suited; in other situations, e.g. for more rapid heat transfer, the larger surface area of smaller droplets may be more suitable. Sufficient water should be added to adequately cool the molten fibers and the surrounding environment, but too much water added causes energy waste in the subsequent drying and curing oven, and washwater waste as well. Fine droplet sizes cool very efficiently, requiring less coolant use than larger droplets to achieve equivalent cooling. But they may not have sufficient momentum to penetrate to the veil interior. Since large amounts of entrained air must be cooled (along with molten material) a high degree of atomization allows the use of less water to cool to the same extent, and increasing the efficiency of the coolant system.

Conversely, large droplets have less surface area for evaporative cooling than fine droplets (for equal mass). Because of this, larger quantities may be required for equivalent evaporative cooling, and the larger droplets may never completely evaporate contributing instead to additional moisture in the pack. However, this may be desirable for some fiberizer units and has the cost advantage of using less compressed air. As noted above, larger droplet sizes may be useful for acidic binder application at initial fiberizer units, such as the first 1-4 or first 1-2 units in a forming hood. These may even be of the size achieved by LP atomization, so as to have sufficient mass that gravity causes them to drop out of the airflow and not be carried to downstream air components where they might cause corrosion.

Fluid Control System-Apparatus

Figure 5:
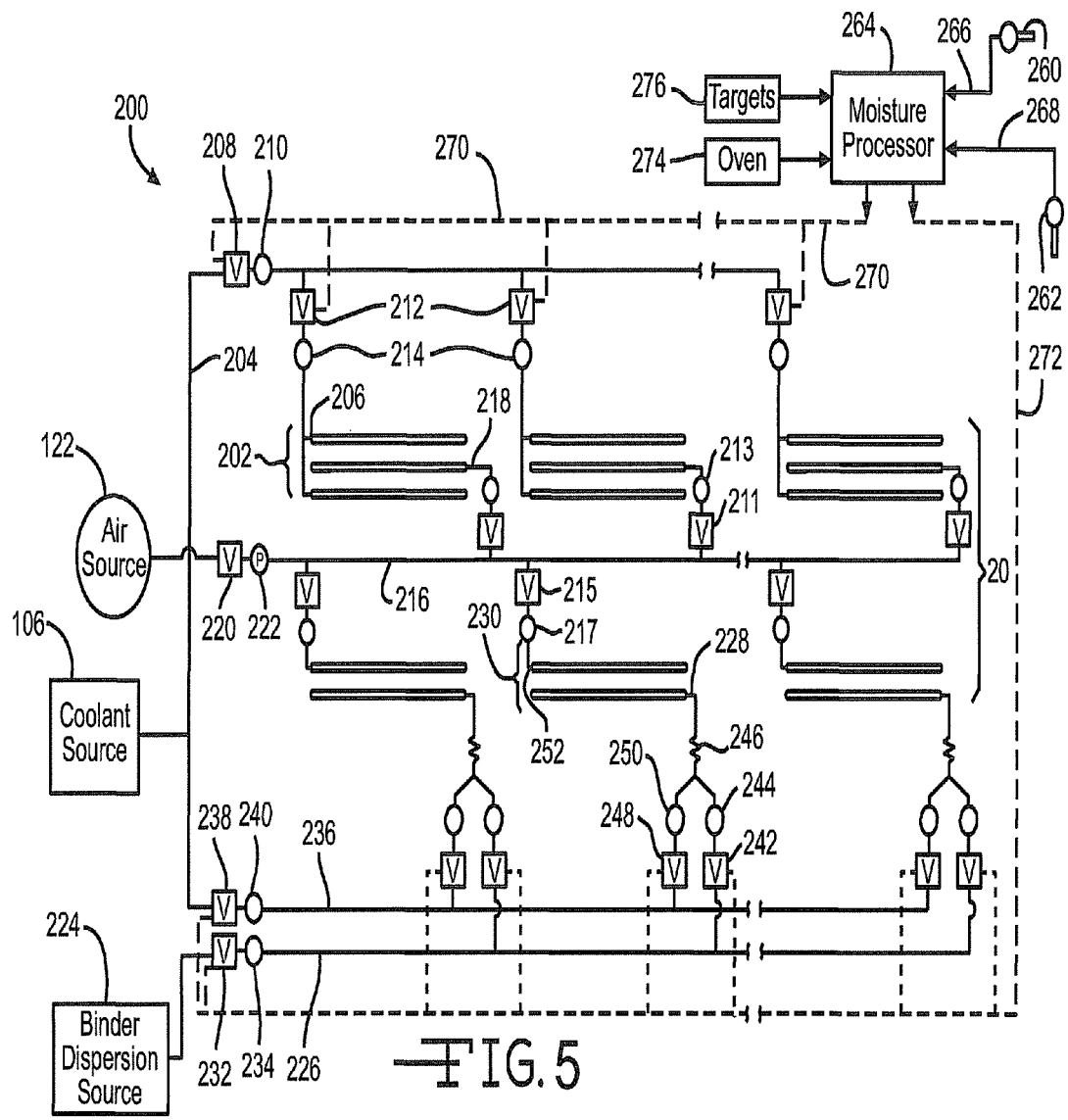
FIG. 5 is a schematic representation of a fluid control system in accordance with the invention.

FIG. 5 depicts a control system 200 for monitoring and controlling the amount of water or moisture in the forming hood. Although the system will be described using air as the compressed gas and water as the coolant liquid, it should be understood that other compressed gasses or coolant liquids might be used instead. A series of coolant spray rings 202 are shown schematically as part of a fiberizing unit, and these may optionally be constructed like the apparatus of FIGS. 3 and 4. A source of coolant water 106 is led via line 204 to an inlet 206 of the coolant ring(s) 202 of each fiberizing unit. Three fiberizing units are shown, although only the first is described in detail, it being understood that the second and subsequent fiberizing units are configured and operate similarly. Water flow to all such coolant rings is globally controlled and monitored at master variable control valve 208 and master meter 210. In addition, the water flow to each individual fiberizing unit ring may be controlled and monitored by individual variable control valves 212 and meters 214 each of which are inserted in the lines going to the coolant rings of sequential fiberizing units.

A source of compressed air 122 provides air that is led via line 216 to an inlet 218 on an air ring associated with the coolant ring 202 at each of the fiberizing units, and this air may be used to atomize the coolant liquid sprayed into the veil, as described above. Air flow to all such coolant rings is globally controlled and monitored at master variable control valve 220 and master meter 222. In addition, individual valves 211 and optional meters 213 are disposed in the line 216 leading to each coolant ring system 202. These enable differential control over the coolant nozzles of the various fiberizer units, as described in an earlier section.

A source of binder dispersion 224, typically a binder concentrate, is led via line 226 ultimately to an inlet 228 of the binder ring 230 of each fiberizing unit. Again, although three fiberizing units are shown, only the second one is described in detail, it being understood that the first and other fiberizing units are configured and operate similarly. Binder rings may comprise 2 or 3 rings and may optionally be constructed like the apparatus of FIGS. 3 and 4, described above. Binder flow to all such binder rings is globally controlled and monitored at master variable control valve 232 and master meter 234. At each individual fiberizing unit (e.g. the second one), the binder concentrate line 226 leads first to an individualized variable control valve 242 and associated meter 244, and then to static mixer 246 before reaching inlet 228 of the binder rings 230. Additionally, a source of water 106 is also led via lines 236 to the binder ring 230 of each fiberizing unit as a potential diluent for the binder concentrate. Diluent flow to all such binder rings is globally controlled and monitored at master variable control valve 238 and master meter 240, and flow to each individual fiberizing unit (e.g. the second one) is controlled by individualized variable control valve 248 and associated meter 250 before reaching static mixer 246 and inlet 228 of the binder rings 230. The flow exiting the static mixer 246 is a "blended flow," the rate of which is the sum of the flow rates measured at meters 244 and 250. A meter (not shown) may be used to record this blended flow rate if desired. As before, a source of compressed air 122 is led via line 216 to an inlet 252 of an air ring associated with the binder ring 230 at each of the fiberizing units, and this air may be used to atomize the binder dispersion sprayed into the veil. Individual valves 215 and optional meters 217 are disposed in line 216 between air source 122 and each individual binder ring systems 230. These valves 215 enable differential control over the binder dispersion nozzles of the various fiberizer units.

One advantage of the fluid control system described above is that it easily adjusts for fiberizing units that need to be shut down for any reason (or restarted following a shutdown), such as for maintenance or for a different fiberizer configuration called for by a job change to a different product. For acidic or otherwise corrosive binder dispersions, the selection of materials for construction of lines, valves, meters, rings and nozzles should take into account the corrosive nature of these binder dispersions.

For all variable control valves, a simple manual knob may be used to vary the flow from a no-flow state to a maximum flow state, which is dictated by the cross-sectional area of the line and the initial pressure as is known in fluid systems. The variable control valves may also comprise more sophisticated, electronically-operated valve systems if desired. Meters used may measure pressure and/or flow at each location. Suitable flow meters include meters from Dwyer, for example the Rotameter brand, as well as other suppliers. Any suitable valve or meter may be employed and are well known to those skilled in the art.

Fluid Control System-Methods of Use

The fluid control system 200 can operate to control or "profile" the fluid delivery at each fiberizing unit 20 independently from other fiberizer units, and thus provides greater control over the main sources of moisture in the forming hood: coolant water, binder diluent, and binder dispersion. As noted above, coolant water is controlled globally by valve 208 and binder diluent is controlled globally by valve 238. More importantly, the introduction of coolant water is controlled more precisely at each individual fiberizing unit 20 by the series of valves 212 which can be used independently to adjust the amount of coolant water provided to each coolant ring 202. Flow control of coolant liquid may result in flow profile that is substantially flat or constant to all fiberizing units (e.g. does not vary by more than 10% among any two units), or a flow profile that varies substantially between at least two units. Similarly, the introduction of binder diluent water (and/or binder dispersion) is controlled more precisely at each individual fiberizing unit 20 by the series of valves 248 which can be used to differentially adjust the amount of binder diluent water provided to each binder ring 230. Any of the valves 212 and 248 may be adjusted to alter or "profile" the amount of water delivered at each fiberizing unit in order to improve the product properties.

It should be noted that binder diluent may be varied with or without altering the rate of delivery of binder chemical. For example, a flow rate of 3.5 LPM of a 20% binder concentrate delivers the same amount of binder chemical as 7 liters/minute (LPM) of dispersion diluted to 10% concentration, but delivers approximately half as much water to the binder ring. By varying the extent of dilution at each fiberizing unit, as shown in the examples, one can "profile" the water input at each fiberizing unit 20 without (or with) affecting the delivery of binder chemical at that unit.

"Profiling" refers to changing the amount of an ingredient, often coolant water but optionally binder dispersion or binder diluent, sprayed at one fiberizing unit from the amount sprayed at another fiberizing unit. Such changes may reflect increasing amounts, decreasing amounts or both; may be gradually incremental or precipitous in nature. Furthermore, fiberizing units may be grouped into two or more sets and "profiles" may include increases or decreases from one set to another. Each set may contain from 1 to about 10 units, typically from 1 to about 4 units. As shown in Example 1 and Table 1 below, set points 1, 5, 7, and 9, among others, are illustrative of "profiling." In set points 1 and 9, the coolant water flows at about 7 liters/minute (LPM) for the initial 2-3 fiberizing units, and then tapers down gradually to about 1 LPM at the $10^{th}$ unit. In set points 5 and 7, the binder diluent is about 5 LPM for the first few fiberizing units and then tapers down to 1 or 1.5 LPM for units 8, 9 and 10. Delivery of binder diluent or binder chemical itself may be similarly profiled if desired.

Profiling can be controlled separately for each liquid and may occur in many patterns, including but not limited to patterns that feature:
- a slight increase or decrease between the fiberizing units #1 and #2, followed by steady, increasing or decreasing flow levels;
- a substantially constant level across nearly all the units;
- a gradual tapering from initial units having an initial value to final units having a final value that is 0-70% of the initial value, more typically from 15-50% of the initial value;
- a tapering until the last set of units, with the flow at the last set of units being held constant at a diminished level;
- a high flow rate at initial units that is up to 100% more than flow at intermediate or final units; and
- a decrease from the initial units to the middle units followed by an increase to the final units, wherein the first and final units would have similar flow rates, and the middle units would have flow rates typically 1-50% lower, more typically 5-20% lower.

"Nozzle profiling," by contrast, refers to profiling as described herein, but at the level of individual nozzles; i.e., controlling the flow of at least one fluid differently from one nozzle to another within the same fiberizer unit. Nozzle profiling can be manifested, for example, as controlling flow differently between: (1) wide-angle nozzles vs. narrow-angle nozzles; (2) upper array nozzles vs. lower array nozzles; (3) nozzles angled more inwardly vs. less inwardly; (4) nozzles angled more downwardly vs. less downwardly; (5) nozzles on one side of the array vs. the other side of the array—in both machine and cross-machine directions; and (6) any combination of these.

In the context of describing fiberizing units, references to "first," "second," "one," and "another" fiberizing unit serves only to differentiate one unit from any other unit and does not refer to any particular ordinal position, such as "next," and is explicitly not limited to specific units or positions #1 and #2. References to initial, middle, final, last, later or subsequent units refer to relative ordinal locations only, but not to any specific units or position. When a specific fiberizing unit is intended, the term "position #" or "unit #" will be used, with #N indicating the position furthest from position #1 in a serial order. However, the serial orientation of the fiberizing units above the conveyor 64 is important, with unit #1 being the unit over bare conveyor 64 as it enters the forming area, the pack 66 growing gradually as the conveyor 64 moves beneath units #2, #3, #4, etc. to the ultimate fiberizing unit #N. The serial orientation of the fiberizing units may correspond with machine direction, but need not, as in the case of split forming.

Figure 6A:
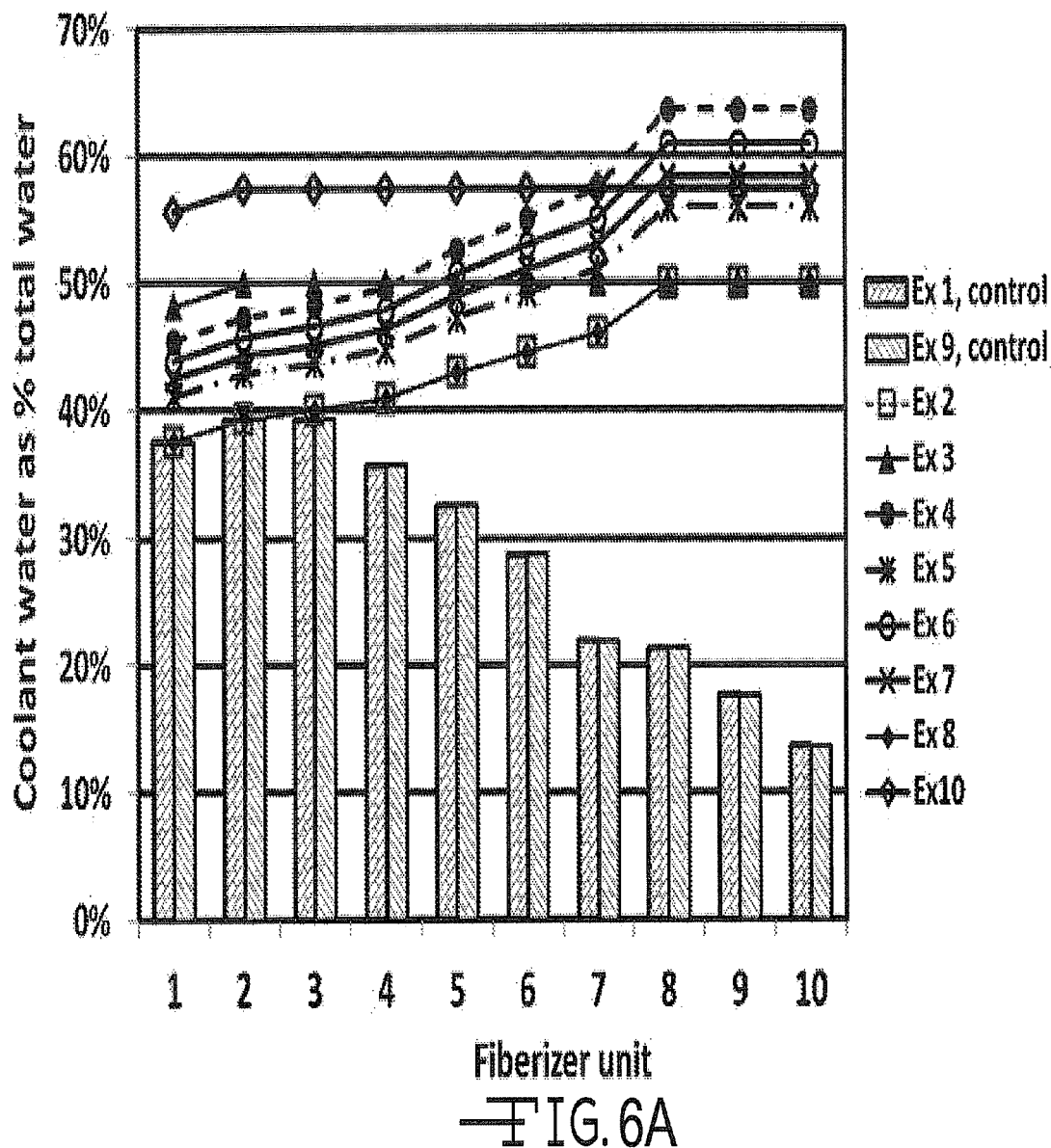
FIGS. 6A-6D are graphs representing certain data, parameters or relationships discussed in the examples.

In addition to being able to control flow more precisely at each fiberizing unit, it has also been found that significantly higher proportions of coolant flow to total liquid flow are possible and desirable to produce higher ramp height and improved product properties. As shown in Examples 1 and 5, prior art production lines have generally used coolant water and other liquids in proportions such that on average across all fiberizing units, coolant water makes up about 15% to about 30% of the total liquids in the forming area. Applicants have found that using considerably higher average levels of coolant liquid in the range of from about 35% to about 80% of total liquids, more typically from about 40% to about 60%, can produce beneficial results. Table 1 and FIG. 6A illustrate this phenomenon, which may also be described as using coolant water "preferentially" and "sacrificially" over binder water for purposes of the forming hood.

Figure 6B:
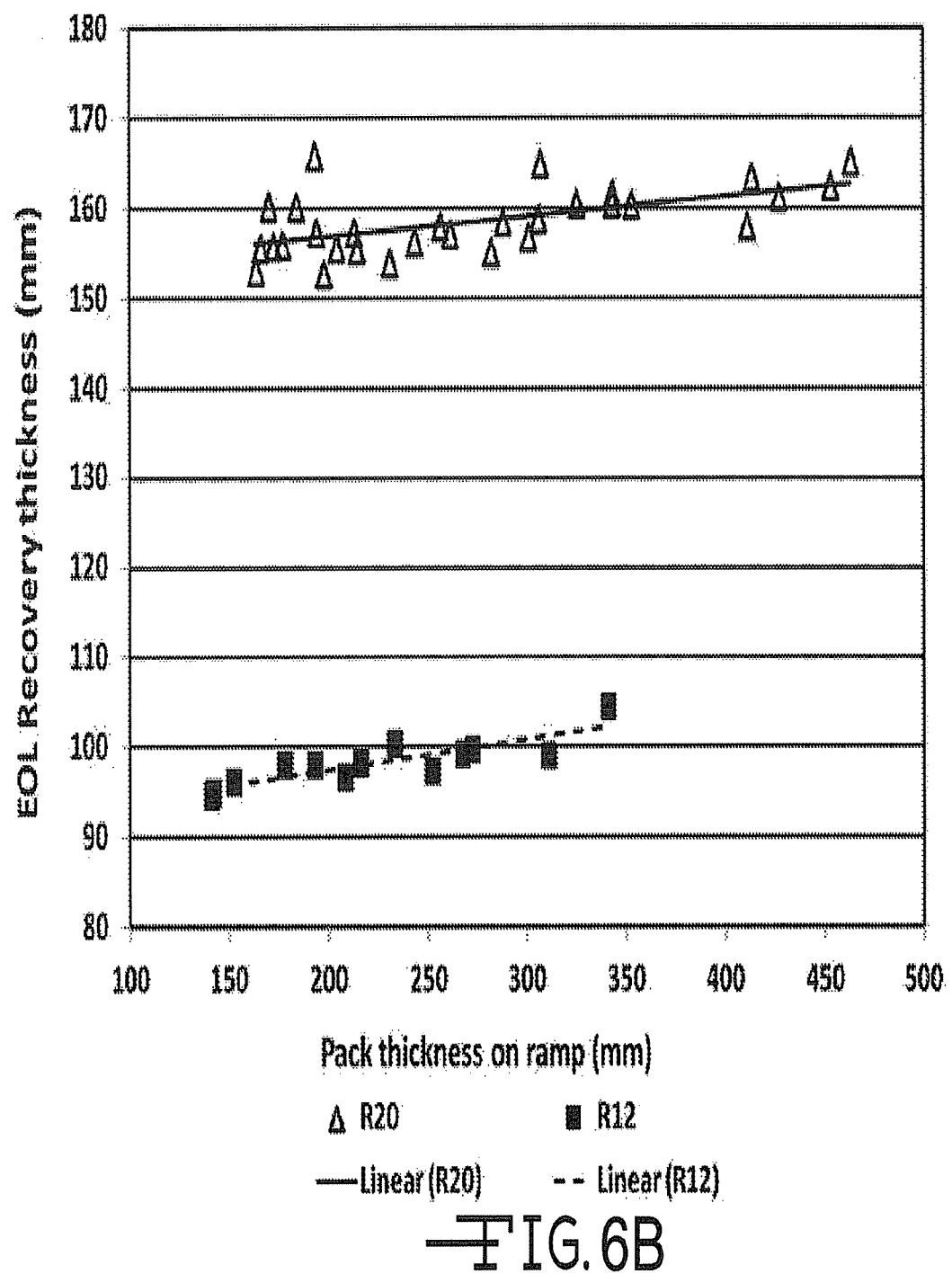
Figure 6C:
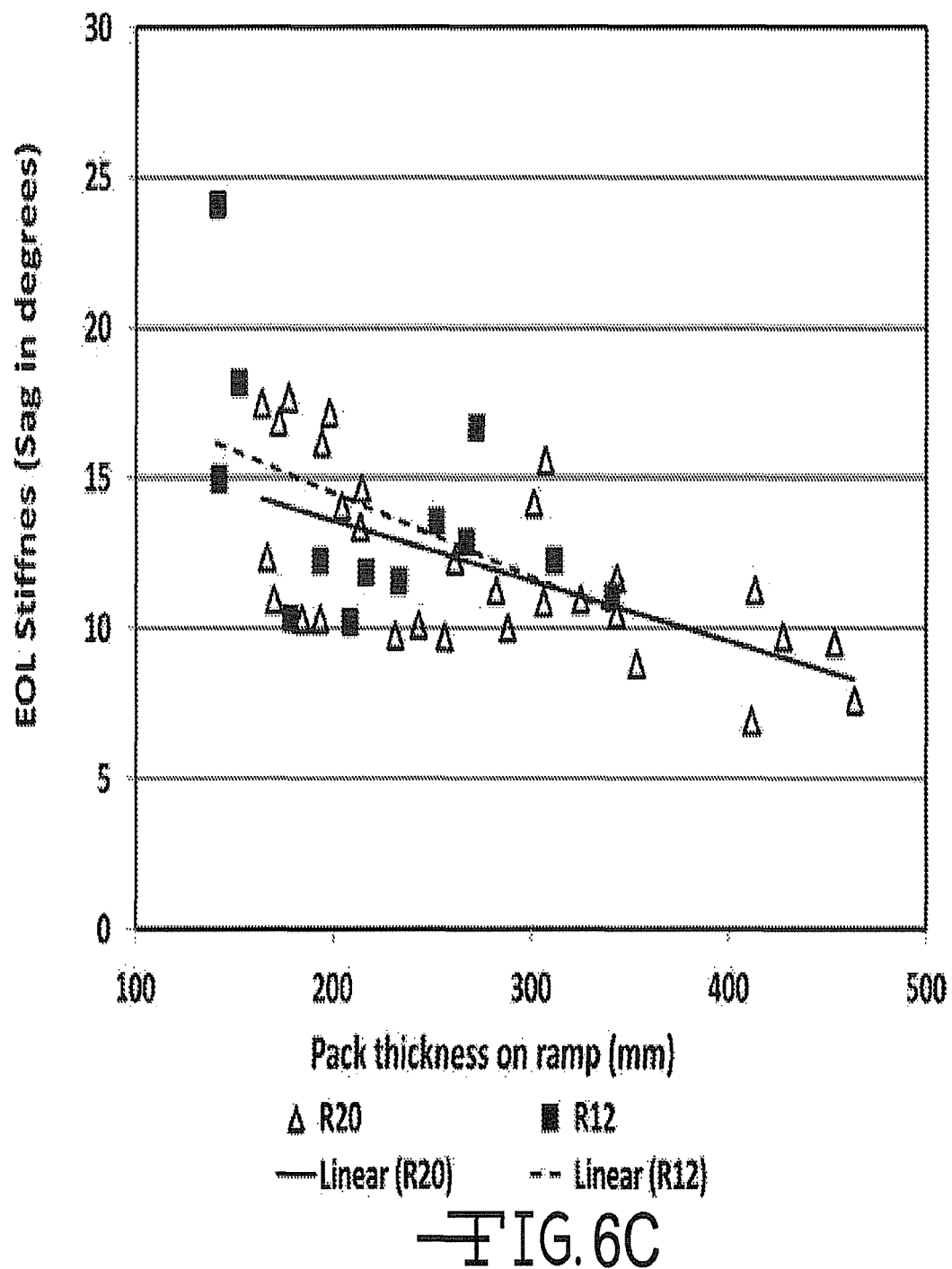
Figure 6D:
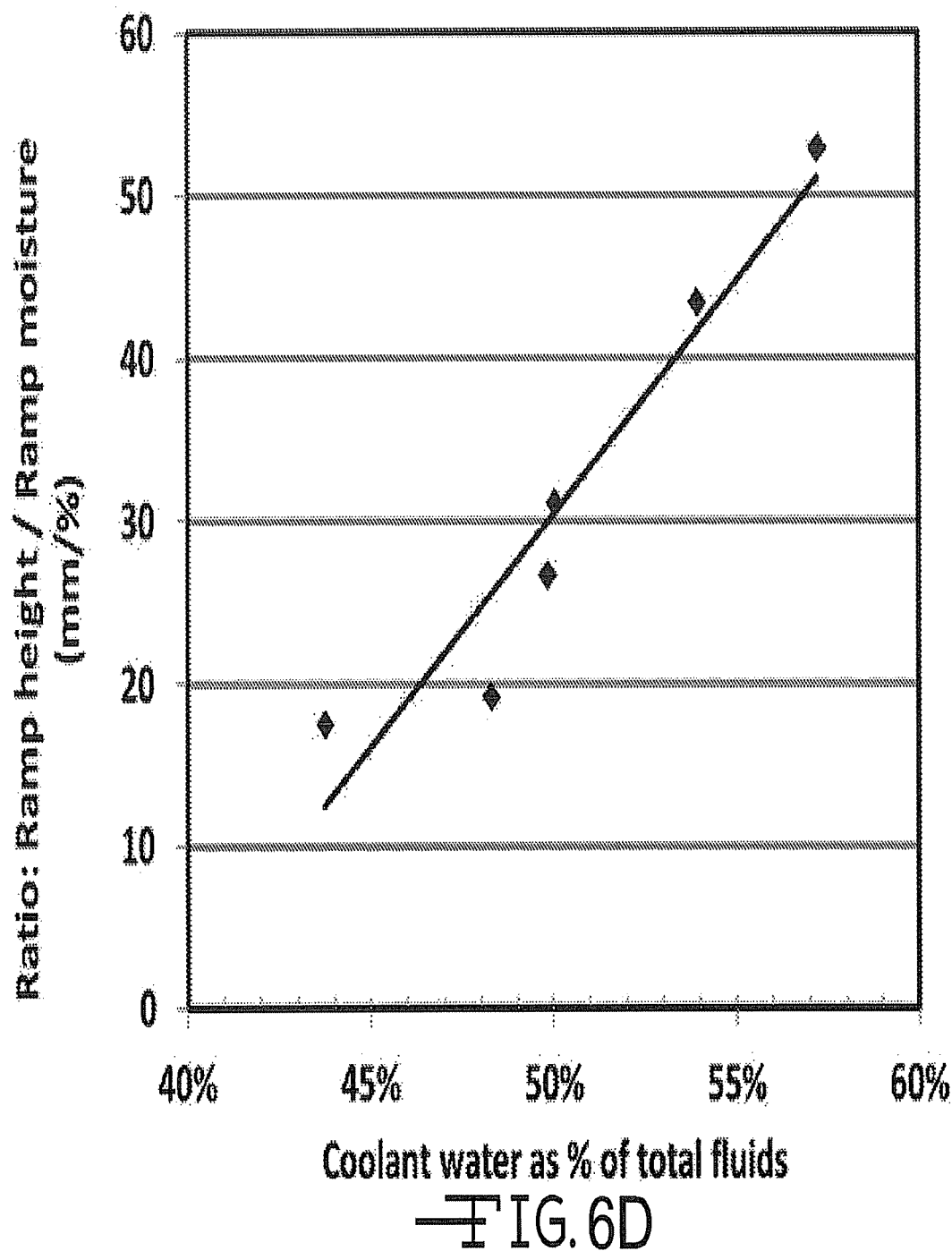

Somewhat surprisingly, this higher proportion of coolant water to total liquids produced higher ramp heights without a correspondingly large increase in ramp moisture. Example 4 and FIG. 6D illustrate this. Accordingly, another method of using the valve system described above, is to improve the ramp height/ramp moisture ratio.

Figure 7:
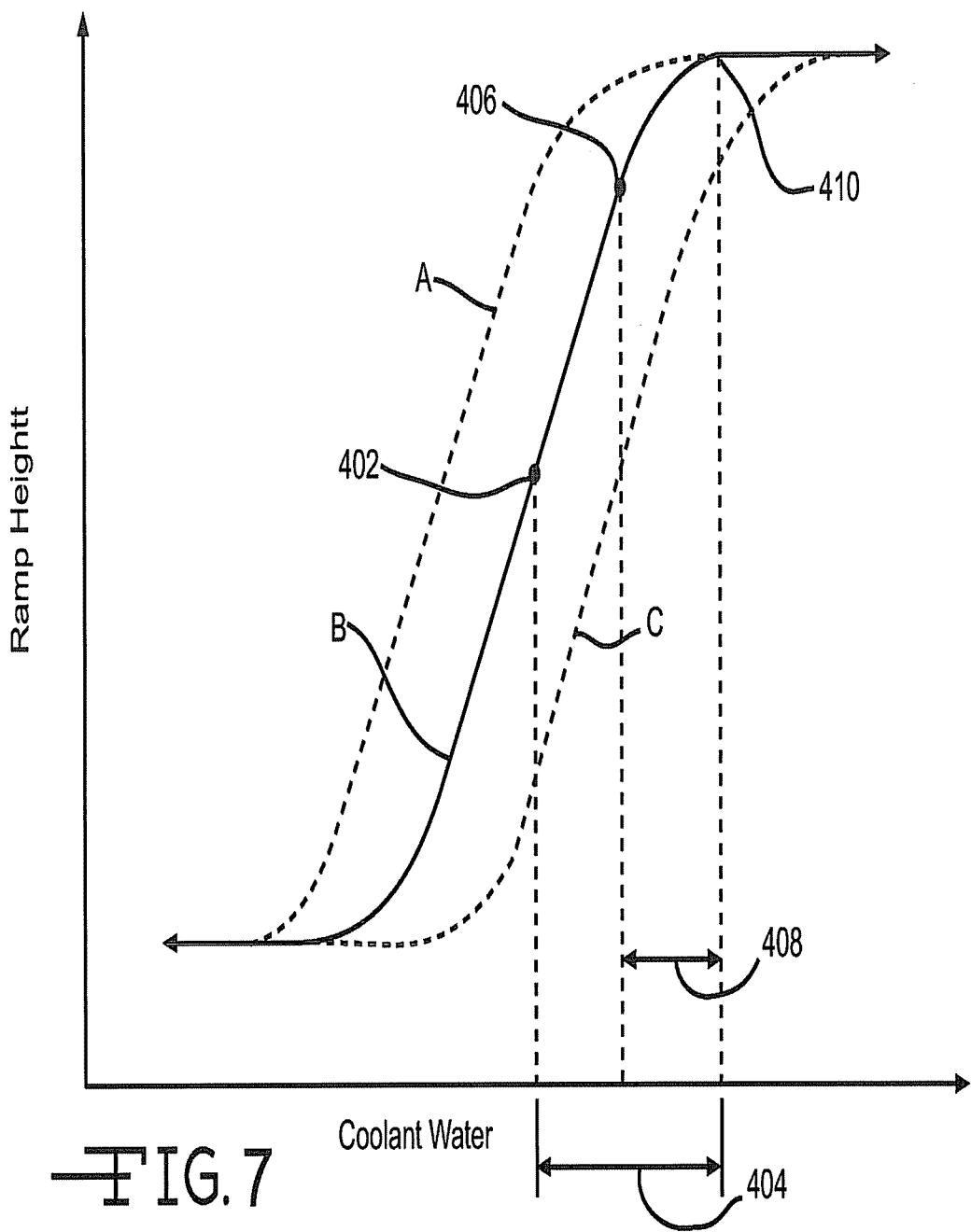
FIG. 7 is a graph representing a general S-curve relationship between forming hood moisture input and "ramp height."

In a related aspect, it has been discovered that there is a level of liquid flow (typically coolant water flow) that is optimal for improved uniformity and product properties. Given adequate curing capacity, uniformity and product properties are generally best when the pack is as thick as possible going into the oven. Also, as a rule the pack thickness or ramp height increases as more water is used in the forming process—but only up to a point. This is represented in FIG. 7, in which the ramp height is plotted as a dependent variable against coolant water flow. This was found to produce a sigmoidal or S-curve A, B, C, which varies in location and shape depending on the thickness and type of product being made, and must be determined empirically for each type of insulation product. For example, the curve may be shallower for R-12 insulation than for R-20 or R-31 insulation; and denser commercial insulation products produce different curves from residential insulation. But the general sigmoidal nature of the curve holds true for each type of insulation.

Moreover, the S-curve B reveals that an optimal level of liquid (water) flow can be determined for each product. When the steeply rising portion of the curve begins to decelerate and plateau, the addition of more coolant water reaches a point of diminishing returns. The coolant flow in this area of the S-curve is termed the "optimal" level of liquid flow. While the exact parameters of each S-curve are determined empirically, the optimal flow area can be described with derivative functions. For example, sigmoidal curves have an inflection point 402 near the middle of the rising portion, where the first derivative reaches a maximum and the second derivative is zero. The optimal flow range 404 will be above this inflection point, where the first derivative is descending from its maximum. Furthermore, while the second derivative is always negative in this optimal area, it reaches a minimum point (maximum negative value) at a secondary inflection point 406 where a third derivative is zero. In preferred embodiments, the preferred optimal flow range 408 is even above this point where the second derivative reaches its minimum value. Coolant flow levels from this point 406 up to the point 410 where the first and second derivatives approach zero are considered preferred optimal flow levels 408.

Another method made possible by the fluid control system of the invention is an ability to limit corrosion of downstream air components of the manufacturing line. Many binder dispersions are acidic (e.g. due to thermosetting agents such as polyacrylic acids, polycarboxylic acids, and the like, or to mineral acids for pH adjustment) and these acidic binders can be very corrosive to metals. A significant corrosion issue arises when portions of these acidic binder dispersions escape the fibrous pack and are sucked through the conveyor and into drop out boxes, ductwork, forming fans and other downstream air components. This is most likely to occur at initial fiberizing units where the fibrous pack has not yet gained much mass to capture the binder. By using the flow or pressure controls for either the binder dispersion itself or an atomizing gas applied to the binder dispersion, the average size of the droplets at the initial fiberizing units can be adjusted separately from the droplet size at subsequent fiberizing units. It has been found that larger droplet sizes, such as can be achieved by LP atomization, if they pass through the conveyor, tend to collect on walls and drains in the suction box area rather than being entrained in the airflow that disperses to the downstream air components. This is thought to be a function of their mass and momentum, but this theory is not essential to the invention. The acidic binder can be washed from the suction box drains, as taught for example in U.S. Pat. No. 7,754,020 to Cline et al., thus saving downstream air components from excessive corrosion.

Alternative Ways to Adjust for More Uniform VWD

A number of alternatives are possible for improving product properties like vertical weight distribution ("VWD"). For example, increasing fiber diameter. A pack with larger fibers has less resistance to air flow through it on the forming chain than a pack with smaller fibers, given the same total amount of glass. This means that the pack with larger fibers will be compressed less than a pack with smaller fibers, and tend to have higher loft recovery coming out of the forming hood. Larger fibers are also stronger than smaller fibers, and so they are able to recover against a viscous binder dispersion better than smaller fibers, again leading to higher loft recovery coming out of the forming hood.

Another alternative means of improving VWD is to alter forming suction, or the air pulled through the pack and chain. Forming suction plays competing roles in pack recovery. On one hand, higher suction means that more ambient air is pulled through the forming hood and pack to cool/dry them, and thus reduce/increase evaporation from the binder dispersion. This is dictated by ambient conditions: on hotter, drier days, higher suction will drive additional evaporation in the hood, while on cooler, more humid days, higher suction will tend to reduce evaporation in the hood. On the other hand, higher suction will compress the pack more, and this aerodynamic compression tends to nonlinearly affect the weight distribution in the pack, such that more fiber is moved towards the bottom of the pack, causing worse VWD.

Another possible means of improving VWD is to alter the ambient entrained air entering the forming hood. Because of the blower air jet used to attenuate and cool the fibers in the fiberizer, there is a non-trivial amount of ambient air, typically from within the plant, that is entrained into the forming hood. This air is primarily what is drawn out through the suction fans. The more this air is cooled and humidified, the less driving force there is for evaporation of the binder dispersion in the forming hood. There are a variety of mechanisms for doing this, all of which are more involved than the direct application of coolant to the veil, and they cause more difficulty for operators to access and maintain the fiberizers and forming hood. Further, all of these methods are not as energy efficient or as easily controlled as the direct application of coolant to the veil. One method is to pipe air in directly from outside the plant into the forming hood, because the hot processes in the plant generally heat outside air before it makes it to the forming hood. This requires significant ducting and alteration of the forming hood. Another method is use of coolant coils near the entry of the forming hood, similar to an air conditioner. This creates additional congestion around the forming hood. Water mist sprays near the entry of the forming hood are another option, and are thought to be the most practical embodiment for conditioning entrained air, though still not as easily controlled as direct coolant spray on the veil.

Similarly, the air jets from the air lappers could be used to assist in improving VWD. The air in these devices could be cooled to reduce evaporation. The air flow could be decreased if the air is hot/dry or increased if the air is cool/humid. The air lappers generally have a small effect on the total heat balance, but they could even be eliminated and an alternate means of lateral weight distribution could be employed.

Another possible means of improving VWD is to profile glass pull along the forming hood from lowest pull at the first unit laying fibers down on the chain to highest pull at the last unit laying fibers down on the chain (whether one or multiple forming chains exist to form the final pack). In this case, the objective is to minimize the dwell time of the pack in the forming hood so that less glass (and binder dispersion) from upstream units is subjected to the evaporative effects of the downstream fiberizers. The bulk of the pack in this case is also experiencing shorter periods of maximum aerodynamic compression from suction before exiting the hood. Clearly, in the extreme, pull could be profiled so that only the last unit before exiting the hood is fiberizing. This is not the most desirable means of operating the forming hood because it generally limits total throughput compared to uniform pull across the hood, especially coupled with direct coolant sprays as in the most preferential method of obtaining pack properties. Also, with each fiberizer running at different pulls, the control of the hood is more complicated.

Condition Feedback Sensors

Still referring to FIG. 5, and ambient sensor 260 and a pack condition sensor 262 are shown connected to control processor 264. The ambient sensor 260 is capable of sensing the local conditions, such as ambient temperature or ambient humidity, or both, and generates at least one output signal 266 representative of the ambient condition, which is fed as an input to the control processor 264. Examples of ambient temperature sensors include thermometers and digital temperature probes. Examples of ambient humidity sensors include hygrometers or psychrometers.

In addition, the pack condition sensor 262 is capable of sensing a condition of the pack on the ramp 82 between the forming hood 12 and the oven 16 or, alternatively, upon exiting the oven 16. Useful pack conditions that a sensor might monitor include (a) the thickness of the uncured pack ("ramp height"), (b) uniformity of the uncured pack thickness, (c) the thickness of the cured pack ("machine height"), (d) uniformity of the cured pack thickness, (e) the uniformity of the moisture distribution in the uncured pack, (f) uniformity of vertical pack density in the uncured pack, (g) uniformity of vertical pack density in the cured pack, and (h) degree of cure in the cured pack.

These pack conditions—and ramp height in particular—have been found to correlate with certain desirable properties of the final insulation product. The sensor generates a feedback output signal 268 representative of the pack condition, which is fed as an input to the control processor 264. Examples of ramp height sensors include simple rulers observed by eye, laser beams, or optical beams at varying heights. Continuous measurement or observation provides historical data and the ability to assess uniformity of pack thickness. Examples of ramp moisture content sensors include microwave and infrared sensors for online measurements, or by sampling the pack, weighting wet and dried samples to determine moisture by difference. Measurement or observation at multiple locations across the breadth or height of the pack provides compound data and the ability to determine the condition of the uniformity of pack moisture and/or density.

Additional pack condition measures (or "blanket condition" measures) may be employed to a cured, "blanket" product after it exits from the oven 16 in a manner analogous to the measures of pack condition. As noted in connection with FIG. 2, a measure of blanket thickness, the "machine height," may also be used as feedback to the moisture control processor 264, in a manner analogous to the ramp height signal. Also, a measure of the degree of cure (or cure status) may be obtained and sent to the control processor 264 for adjustment of liquid input. For example, if the product is sensed to be undercured, it may be desirable to restrict the liquid input to the forming area.

Outputs from the ambient and pack sensors 260, 262 are used as feedback to set or reset the variable control valves to control the flow of various liquids going into the forming hood. For this purpose, control processor 264 includes a first output 270 for controlling the variable control valves 208, 212 responsible for introducing water via the coolant rings 202; and a second output 272 for controlling the variable control valves 232, 238, 242, 248 responsible for introducing water via the binder rings 230. For clarity, only a single output line 270, 272 is shown for each fluid dispensing system, however in reality a plurality of signal lines is desired, one for each valve to be controlled. Thus, the control processor 264 may be used to adjust any of the fluids mentioned above, either globally across all fiberizing positions (via valves 208, 238 or 232), or individually at one or more individual fiberizing units. Feedback signals, and the adjustments made in response to such feedback, may be provided continuously or at predetermined time increments, depending on the tolerance for variability in the process.

The control signals 270, 272 may be employed to create a profiled flow of a particular liquid or an even flow as the conditions warrant. For example, if pack condition sensor 262 indicates a ramp height that is less than a desired target height, the processor 264 may call for opening valve 208, or certain valves 212 to increase the coolant water into the forming area 12. As another example, if the operator observes insulation packs 66 with acceptable ramp height, but with a "boardy bottom" he may take either of two potential actions: (a) he might increase flow of coolant water to initial fiberizing units via initial valves 212, while maintaining or decreasing the flow at subsequent valves 212; or (b) he might decrease the flow of binder to initial fiberizing units via valves 242 and maintain or increase it at the valves 242 of subsequent fiberizing units. As a further example, if a moisture uniformity feedback indicated that a top layer of the pack contained high moisture relative to lower layers, a reasonable feedback control would decrease water (coolant or binder diluent) flow at fiberizing units positioned near the downstream end of the forming hood (in a machine direction).

In some embodiments, the control processor 264 includes another input to accommodate feedback (line 328 in FIG. 2) from the oven 274, and for entry of target or predetermined set points 276. The oven feedback 328 may be indicative of any capacity limited condition, such as maximum airflow, temperature or fan speed. Finally, if a capacity of oven 274 is exceeded, the result is likely a product that is not fully cured. In such a condition, the operator may dial back the flow of liquid at one or more fiberizing units, completely eliminate one or more units, or decrease throughput (residence time) to bring the total moisture within the oven's capacity. The targets 276 may be pre-programmed into a processor or entered locally via input means (not shown) such as keyboard or touchscreen. The processor 264 then compares the sensor output 266, 268 to the predetermined target 276 to determine what response it should direct via outputs 270, 272. Target values for ramp height (pack thickness) will depend on the specific product being made and its intended R-value. Uniformity targets might be set like process control limits, whereby acceptable ranges (e.g. +/−a certain percent) above and below the target may be established. Target values for moisture content can be determined by the range of acceptable moisture content bounded by the loss of recovery/thickness on the lower end and by the drying/curing capacity of the oven on the upper end.

Any of the feedback controls described above may be performed manually with an operator involved to make the adjustment called for by the feedback. Alternatively, when the test or measure can be performed online continuously, such as with ambient temperature or humidity, ramp height or machine height, and others, the feedback may be automated and controlled by logic circuitry, which could reside in the moisture processor 264.

EXAMPLES

Example 1

Trials are conducted with varying amounts of water delivered to each of 10 fiberizing units. Ten set points or examples were designed according to Table 1, below. Liquids enter the forming hood as binder dispersion, as diluent for the binder dispersion, or as coolant water, the level of each being varied or held constant as shown in Table 1. Set points 1 and 9 were designed as controls with decreasing or profiled diluent and coolant water at lower average levels to represent the current state of the art. Other set points held various sources of water constant or flat at higher average levels, while others were varied or profiled from one unit to the next. Flows are given in liters per minute, LPM.

TABLE 1

| SetPt | Fiber. Unit: Liquids | 1 | 2 | 3 | 4 | 5 | 6 | 7 | 8 | 9 | 10 | TOTAL |
|---|---|---|---|---|---|---|---|---|---|---|---|---|
| | Flow* set points for liquids control (as designed**) | | | | | | | | | | | |
| 1 | binder | 7 | 7 | 7 | 7 | 7 | 7 | 7 | 7 | 7 | 7 | 70 |
| | diluent | 3.8 | 3.8 | 3.5 | 3.1 | 2.3 | 1.7 | 1.2 | 0 | 0 | 0 | 19.4 |
| | coolant | 6.5 | 7 | 6.8 | 5.6 | 4.5 | 3.5 | 2.3 | 1.9 | 1.5 | 1.1 | 40.7 |
| | total fl. | 17.3 | 17.8 | 17.3 | 15.7 | 13.8 | 12.2 | 10.5 | 8.9 | 8.5 | 8.1 | 130.1 |
| | bind + dil | 10.8 | 10.8 | 10.5 | 10.1 | 9.3 | 8.7 | 8.2 | 7 | 7 | 7 | 89.4 |
| | Coolant as % tot. | 38% | 39% | 39% | 36% | 33% | 29% | 22% | 21% | 18% | 14% | Avg. 29% |
| 2 | binder | 7 | 7 | 7 | 7 | 7 | 7 | 7 | 7 | 7 | 7 | 70 |
| | diluent | 3.8 | 3.8 | 3.5 | 3.1 | 2.3 | 1.7 | 1.2 | 0 | 0 | 0 | 19.4 |
| | coolant | 6.5 | 7 | 7 | 7 | 7 | 7 | 7 | 7 | 7 | 7 | 69.5 |
| | total fl. | 17.3 | 17.8 | 17.5 | 17.1 | 16.3 | 15.7 | 15.2 | 14 | 14 | 14 | 158.9 |
| | bind + dil | 10.8 | 10.8 | 10.5 | 10.1 | 9.3 | 8.7 | 8.2 | 7 | 7 | 7 | 89.4 |
| | Coolant as % tot. | 38% | 39% | 40% | 41% | 43% | 45% | 46% | 50% | 50% | 50% | Avg. 44% |
| 3 | binder | 7 | 7 | 7 | 7 | 7 | 7 | 7 | 7 | 7 | 7 | 70 |
| | diluent | 0 | 0 | 0 | 0 | 0 | 0 | 0 | 0 | 0 | 0 | 0 |
| | coolant | 6.5 | 7 | 7 | 7 | 7 | 7 | 7 | 7 | 7 | 7 | 69.5 |
| | total fl. | 13.5 | 14 | 14 | 14 | 14 | 14 | 14 | 14 | 14 | 14 | 139.5 |
| | bind + dil | 7 | 7 | 7 | 7 | 7 | 7 | 7 | 7 | 7 | 7 | 70 |
| | Coolant as % tot. | 48% | 50% | 50% | 50% | 50% | 50% | 50% | 50% | 50% | 50% | Avg. 50% |
| 4 | binder | 4 | 4 | 4 | 4 | 4 | 4 | 4 | 4 | 4 | 4 | 40 |
| | diluent | 3.8 | 3.8 | 3.5 | 3.1 | 2.3 | 1.7 | 1.2 | 0 | 0 | 0 | 19.4 |
| | coolant | 6.5 | 7 | 7 | 7 | 7 | 7 | 7 | 7 | 7 | 7 | 69.5 |
| | total fl. | 14.3 | 14.8 | 14.5 | 14.1 | 13.3 | 12.7 | 12.2 | 11 | 11 | 11 | 128.9 |
| | bind + dil | 7.8 | 7.8 | 7.5 | 7.1 | 6.3 | 5.7 | 5.2 | 4 | 4 | 4 | 59.4 |
| | Coolant as % tot. | 45% | 47% | 48% | 50% | 53% | 55% | 57% | 64% | 64% | 64% | Avg. 55% |
| 5 | binder | 4 | 4 | 4 | 4 | 4 | 4 | 4 | 4 | 4 | 4 | 40 |
| | diluent | 5.3 | 5.3 | 5 | 4.6 | 3.8 | 3.2 | 2.7 | 1.5 | 1.5 | 1.5 | 34.4 |
| | coolant | 6.5 | 7 | 7 | 7 | 7 | 7 | 7 | 7 | 7 | 7 | 69.5 |
| | total fl. | 15.8 | 16.3 | 16 | 15.6 | 14.8 | 14.2 | 13.7 | 12.5 | 12.5 | 12.5 | 143.9 |
| | bind + dil | 9.3 | 9.3 | 9 | 8.6 | 7.8 | 7.2 | 6.7 | 5.5 | 5.5 | 5.5 | 74.4 |
| | Coolant as % tot. | 41% | 43% | 44% | 45% | 47% | 49% | 51% | 56% | 56% | 56% | Avg. 49% |
| 6 | binder | 4 | 4 | 4 | 4 | 4 | 4 | 4 | 4 | 4 | 4 | 40 |
| | diluent | 4.3 | 4.3 | 4 | 3.6 | 2.8 | 2.2 | 1.7 | 0.5 | 0.5 | 0.5 | 24.4 |
| | coolant | 6.5 | 7 | 7 | 7 | 7 | 7 | 7 | 7 | 7 | 7 | 69.5 |
| | total fl. | 14.8 | 15.3 | 15 | 14.6 | 13.8 | 13.2 | 12.7 | 11.5 | 11.5 | 11.5 | 133.9 |
| | bind + dil | 8.3 | 8.3 | 8 | 7.6 | 6.8 | 6.2 | 5.7 | 4.5 | 4.5 | 4.5 | 64.4 |
| | Coolant as % tot. | 44% | 46% | 47% | 48% | 51% | 53% | 55% | 61% | 61% | 61% | Avg. 53% |
| 7 | binder | 4 | 4 | 4 | 4 | 4 | 4 | 4 | 4 | 4 | 4 | 40 |
| | diluent | 4.8 | 4.8 | 4.5 | 4.1 | 3.3 | 2.7 | 2.2 | 1 | 1 | 1 | 29.4 |
| | coolant | 6.5 | 7 | 7 | 7 | 7 | 7 | 7 | 7 | 7 | 7 | 69.5 |
| | total liquids | 15.3 | 15.8 | 15.5 | 15.1 | 14.3 | 13.7 | 13.2 | 12 | 12 | 12 | 138.9 |
| | bind + dil | 8.8 | 8.8 | 8.5 | 8.1 | 7.3 | 6.7 | 6.2 | 5 | 5 | 5 | 69.4 |
| | Coolant as % tot. | 42% | 44% | 45% | 46% | 49% | 51% | 53% | 58% | 58% | 58% | Avg. 51% |
| 8 | binder | 7 | 7 | 7 | 7 | 7 | 7 | 7 | 7 | 7 | 7 | 70 |
| | diluent | 3.8 | 3.8 | 3.5 | 3.1 | 2.3 | 1.7 | 1.2 | 0 | 0 | 0 | 19.4 |
| | coolant | 6.5 | 7 | 7 | 7 | 7 | 7 | 7 | 7 | 7 | 7 | 69.5 |
| | total fl. | 17.3 | 17.8 | 17.5 | 17.1 | 16.3 | 15.7 | 15.2 | 14 | 14 | 14 | 158.9 |
| | bind + dil | 10.8 | 10.8 | 10.5 | 10.1 | 9.3 | 8.7 | 8.2 | 7 | 7 | 7 | 89.4 |
| | Coolant as % tot. | 38% | 39% | 40% | 41% | 43% | 45% | 46% | 50% | 50% | 50% | Avg. 44% |
| 9 | binder | 7 | 7 | 7 | 7 | 7 | 7 | 7 | 7 | 7 | 7 | 70 |
| | diluent | 3.8 | 3.8 | 3.5 | 3.1 | 2.3 | 1.7 | 1.2 | 0 | 0 | 0 | 19.4 |
| | coolant | 6.5 | 7 | 6.8 | 5.6 | 4.5 | 3.5 | 2.3 | 1.9 | 1.5 | 1.1 | 40.7 |
| | total fl. | 17.3 | 17.8 | 17.3 | 15.7 | 13.8 | 12.2 | 10.5 | 8.9 | 8.5 | 8.1 | 130.1 |
| | bind + dil | 10.8 | 10.8 | 10.5 | 10.1 | 9.3 | 8.7 | 8.2 | 7 | 7 | 7 | 89.4 |
| | Coolant as % tot. | 38% | 39% | 39% | 36% | 33% | 29% | 22% | 21% | 18% | 14% | Avg. 29% |

TABLE 1-continued

Flow* set points for liquids control (as designed**)

| SetPt | Fiber. Unit: Liquids | 1 | 2 | 3 | 4 | 5 | 6 | 7 | 8 | 9 | 10 | TOTAL |
|---|---|---|---|---|---|---|---|---|---|---|---|---|
| 10 | binder | 4 | 4 | 4 | 4 | 4 | 4 | 4 | 4 | 4 | 4 | 40 |
|  | diluent | 1.2 | 1.2 | 1.2 | 1.2 | 1.2 | 1.2 | 1.2 | 1.2 | 1.2 | 1.2 | 12 |
|  | coolant | 6.5 | 7 | 7 | 7 | 7 | 7 | 7 | 7 | 7 | 7 | 69.5 |
|  | total fl. | 11.7 | 12.2 | 12.2 | 12.2 | 12.2 | 12.2 | 12.2 | 12.2 | 12.2 | 12.2 | 121.5 |
|  | bind + dil | 5.2 | 5.2 | 5.2 | 5.2 | 5.2 | 5.2 | 5.2 | 5.2 | 5.2 | 5.2 | 52 |
|  | Coolant as % tot. | 56% | 57% | 57% | 57% | 57% | 57% | 57% | 57% | 57% | 57% | Avg. 57% |

*Other than percent calculations, flows given in the table above are in liters per minute or LPM.
**Not all set point trials were actually carried out.

A graph representing the coolant water fraction as a percent of the total water is provided as FIG. 6A. Control set points 1 and 9 illustrate the state of the art practice of using high levels of water at initial fiberizing units (primarily for emissions control) and tapering that water at later units to avoid excess moisture and drying time. In contrast, the experimental set points 2-8 and 10 all depict how coolant liquid as a percent of total liquid monotonically increases from initial fiberizing units to later ones. A "monotonic increase" means that the level never decreases; it continually goes up or at least remains steady. In mathematical terms, the first derivative may be positive or zero, but never negative.

A second observation from the data of Table 1 and FIG. 6A is that the two control set points (set points 1 and 9) have an average percent coolant to total liquids of 29%. This is consistent with prior art usage where average percentage of coolant water across all units in the forming area is about 25-35%, rarely exceeding 40% at any one unit. In contrast, in the experimental set points, the coolant water percent is rarely less than 40% at any one unit and the average for all experimental set points is in the range of about 44% to about 60%, far higher than state of the art levels. Significantly more coolant water is being used than before, both absolutely and as a percent of the total liquids from binder diluent/binder dispersion and coolant.

Ramp and end of line ("EOL") product properties measured for some of the set points are presented in Table 2, below.

measures all improved dramatically with increased thickness of the pack as it exits the forming area and regains its uncompressed state, i.e. the "ramp height."

Insulation batts having R-values of R12 and R20 were prepared in standard commercial operations. Quality control data was examined from these manufacturing runs to obtain values for EOL recovery and stiffness/sag at varying run times. Production data was mined to obtain ramp height and these ramp heights were paired to respective product properties for each selected run time. It was found that both recovery and stiffness/sag exhibited correlation to ramp height for both R12 and R20 batts. FIGS. 6B and 6C depict this relationship. Recovery thickness averaged about 98 mm for R12 and about 160 mm for R20. As ramp height increased, the loft recovery of both R-values also increased (FIG. 6B). In contrast, as ramp height increased the sag angle of deflection decreased (indicating a stiffer batt) for batts of both R-values (FIG. 6C).

Without intending to be bound by any particular theory, it is believed that upon recompression to bridge height for curing in the oven, any initial density variances are more easily minimized with thicker ramp heights than with thinner ramp heights. "Boardy" bottom, a specific form of non-uniform density distributions, is also reduced or eliminated with increased ramp height.

Example 3

Trials were also run to determine the impact of relative amounts of binder flow and coolant water flow. Set points

TABLE 2

Selected Ramp and EOL measurements

| Set Pt. # | min pH | avg pH | avg ramp moisture (%) | recovery (mm) | stiffness (deg) | approx. ramp height (mm) | ramp height/ ramp moisture (mm/%) |
|---|---|---|---|---|---|---|---|
| 1 | 4.60 | 5.75 | 0.68 | 93 | 7.9 | 200 |  |
| 2 | 3.44 | 3.95 | 24.49 | 91.4 | 7.6 | 440 | 18.0 |
| 3 | 3.58 | 4.64 | 16.98 | 88.8 | 36.2 | 460 | 27.1 |
| 4 | 4.27 | 5.68 | 5.70 | 94 | 5.1 | 250 | 43.9 |
| 5 | 3.75 | 4.65 | 19.90 | 86.2 | 14.1 | 390 | 19.6 |
| 10 | 5.35 | 6.01 | 5.81 | 92.7 | 5.7 | 310 | 53.4 |
| 7 | 3.76 | 5.02 | 11.41 | 85.6 | 19 | 360 | 31.6 |

Example 2

It was found that there were important relationships between several of the variables presented in Table 2. For example, it was discovered that the product properties of vertical weight distribution (VWD), also understood as the vertical density distribution, recovery measures and stiffness called for binder flows of 4, 5, and 6 LPM, with binder concentrations being adjusted for equal delivery of binder chemical (same solids/same LOI content). Flow of coolant water was varied and ramp height was monitored. For each binder flow level (4, 5, or 6 LPM), the minimum and maximum ramp heights were about the same, roughly 250 mm for the minimum and 450 mm for the maximum. But at each different binder flow (4, 5, or 6 LPM) it took a different level of coolant flow to achieve the same ramp height levels. As expected, when the binder flow went down, the level of coolant flow had to be increased to achieve comparable ramp heights. Thus, ramp height is related to the total water provided to the forming hood.

Example 4

As noted from Example 3, more moisture in the forming hood led to higher ramp heights. However, it was surprisingly found that this was not accompanied by a corresponding increase in ramp moisture. That last column of Table 2 demonstrates this. Ramp heights were normalized to moisture content by calculating a ratio of ramp height (mm) to moisture content (%). This reveals that higher percentages of coolant water produced increased ramp heights without unduly increasing moisture content. FIG. 6D plots this data as an illustration. As the percentage of coolant water increases, the ramp height for a given amount of ramp moisture increases also.

Example 5

To illustrate the degree to which higher levels of moisture are being used, applicants mined production data to produce the data in Table 3 below. Products with varying R values and binder composition were identified. The coolant water/total water percentage for individual prior art products (PUF and PA) varies from about 13% to about 30%, with the group average being 20%. In contrast, the coolant water/total water percentage for individual products according to the invention (NS) varies from about 44% to about 51%, with the group average being 49%. Consistently higher average levels of coolant water are used, in nearly flat profiles.

preferred range 408) that produces the highest ramp height and best product properties. Additional coolant water beyond this optimum level does not improve ramp height much further. FIG. 7 depicts S-curves 400 that illustrate similar data.

Example 6

In further trials, it was learned that ambient conditions—specifically temperature and humidity—also affected the ramp height and consequently the product properties, due to the large volumes of induced or entrained air that are brought into the forming hood. A mass and energy balance model for the pack forming process is used to analyze the sensitivity of coolant flow to changes in ambient conditions. Any ambient condition change that increases evaporation (e.g. temperature increase or humidity decrease) tends to reduce ramp height and moisture, and it is possible to compensate for the impact of changing ambient conditions by adjusting liquid flow into the forming hood. Furthermore, it was possible to quantify this compensation relationship. For example, coolant flow per fiberizing unit can be adjusted by about +0.05 to about +0.3 LPM per degree C. change in ambient temperature, and can be adjusted by about −0.05 to about −0.25 LPM per 0.001 (kg moisture/kg dry air) change in ambient specific humidity, with the sign (+/−) indicating direction of adjustment relative to the direction of the ambient change. The sensitivities as determined by the heat balance can be used as starting points for moisture control, subject to refinement in production based on feedback measurements like ramp height or others as discussed herein.

Additionally, the S-curve B of Example 5 and FIG. 7 was found to shift right or left with changes in ambient conditions. For simplicity of description, it will be assumed that other ambient conditions remain constant. An increase in ambient

TABLE 3

Average coolant water levels as % of total

| Product ID | Binder Type | Unit #1 | #2 | #3 | #4 | #5 | #6 | #7 | #8 | #9 | #10 | Avg % Coolant Water |
|---|---|---|---|---|---|---|---|---|---|---|---|---|
| T-R31 | NS | 51% | 51% | 42% | 41% | 41% | 41% | 41% | 44% | 46% | 46% | 44% |
| T-QZ | NS | 53% | 50% | 49% | 49% | 49% | 49% | 49% | 49% | 49% | 49% | 49% |
| T-R20SX | NS | 52% | 50% | 49% | 49% | 49% | 49% | 49% | 49% | 49% | 49% | 50% |
| T-R13 | NS | 53% | 50% | 50% | 50% | 50% | 50% | 50% | 50% | 50% | 50% | 50% |
| T-R20 | NS | 53% | 51% | 50% | 50% | 51% | 50% | 50% | 50% | 50% | 50% | 51% |
| N-TRS10 | PA | 20% | 19% | 19% | 16% | 10% | 10% | 10% | 10% | 10% | 10% | 13% |
| N-TRS40r | PA | 35% | 35% | 32% | 29% | 21% | 10% | 10% | 10% | 10% | 10% | 20% |
| N-TRS40b | PA | 40% | 40% | 26% | 21% | 15% | 10% | 10% | 10% | 10% | 21% | 20% |
| N-R22 | PUF | 14% | 21% | 21% | 17% | 13% | 14% | 12% | 11% | 12% | 11% | 15% |
| N-R30 | PUF | 23% | 23% | 24% | 15% | 15% | 15% | 15% | 15% | 14% |  | 18% |
| N-R21 (MBI) | PUF | 21% | 23% | 20% | 20% | 20% | 20% | 18% | 18% | 14% | 11% | 19% |
| N-nr2 | PUF | nr | nr | nr | nr | nr | nr | nr | nr | nr | nr | 29% |
| N-nr1 | PUF | nr | nr | nr | nr | nr | nr | nr | nr | nr | nr | 30% |

Legend:
NS = natural starch;
PA = polyacrylic acid;
PUP = phenolic/formaldehyde;
nr = not recorded While the use of increased coolant water produces improved ramp height and desirable properties, eventually enough ramp moisture is introduced that oven drying capacity may be exceeded. However, if levels of coolant water are set too low, the product suffers from density distribution problems including "boardy bottoms" and reduced stiffness and recovery. Within these limits, there is range of tolerable water inputs, near the top of which is an optimal water level 404 (or temperature shifts the curve rightward (as from curve B to curve C), such that an equivalent flow of coolant liquid produces a lower ramp height due to increased drying/evaporation. Conversely, an increase in the ambient humidity shifts the curve leftward (as from curve B to curve A), such that an equivalent flow of coolant liquid produces a higher ramp height. Obviously, as the curve shifts from B to A or B to C, the optimal coolant flow ranges 404, 408 shift as well. Knowing the relationships discussed above and how they are impacted by ambient conditions allows finer control of the fiberizing process, which produces more uniform product having improved product properties.

The principle and mode of operation of this invention have been explained and illustrated in its preferred embodiment. However, it must be understood that this invention may be practiced otherwise than as specifically explained and illustrated without departing from its spirit or scope.

We claim:

1. A method of making a fibrous product comprising:
   forming molten material into fibers;
   spraying the fibers with a coolant liquid to cool the fibers, wherein a flow rate of the sprayed coolant liquid is controllable;
   spraying the cooled fibers with a binder dispersion at a constant flow rate by spraying the cooled fibers with a plurality of binder spray rings, wherein two or more of the binder spray rings spray binder dispersion at different flow rates;
   directing the fibers toward a conveyor to form an uncured fibrous pack;
   measuring a thickness of the uncured pack;
   controlling the flow rate of the sprayed coolant liquid based on the measured thickness of the uncured pack, while maintaining the spraying of the cooled fibers with the binder dispersion at a constant flow rate.

2. The method of claim 1 wherein said controlling the flow rate of the sprayed coolant liquid comprises increasing the flow rate of the coolant liquid when the measured thickness of the uncured pack is below a target thickness.

3. The method of claim 2 wherein said increasing the flow rate of the coolant liquid increases the measured pack thickness without a correspondingly large increase in moisture content of the uncured pack.

4. The method of claim 2 wherein said controlling the flow rate of the sprayed coolant liquid comprises decreasing the flow rate of the coolant liquid when the measured thickness of the uncured pack is above the target thickness.

5. The method of claim 1 wherein the coolant liquid is water.

6. The method of claim 1 wherein the flow rate of the sprayed coolant liquid is controlled such that the coolant liquid is maintained in the range of about 44% to about 60% of total liquids applied to the fibers before the fibers are deposited on the conveyor.

7. The method of claim 6 wherein said range of about 44% to about 60% of coolant liquid does not cause a correspondingly large increase in moisture content of the uncured pack.

8. The method of claim 1 further comprising curing the binder in the pack.

9. The method of claim 1 wherein said spraying the fibers with a coolant liquid to cool the fibers, comprises spraying the fibers with a plurality of coolant spray rings.

10. The method of claim 9 wherein two or more of the coolant spray rings spray coolant fluid at different flow rates.

11. The method of claim 1 wherein the steps of measuring the thickness of the uncured pack and controlling the flow rate of the sprayed coolant liquid based on the measured thickness of the uncured pack are repeated continuously during a manufacturing run.

12. The method of claim 1 wherein the steps of measuring the thickness of the uncured pack and controlling the flow rate of the sprayed coolant liquid based on the measured thickness of the uncured pack are repeated at time increments during a manufacturing run.

* * * * *